(12) United States Patent
Erhart et al.

(10) Patent No.: US 8,290,150 B2
(45) Date of Patent: Oct. 16, 2012

(54) METHOD AND SYSTEM FOR ELECTRONICALLY SECURING AN ELECTRONIC DEVICE USING PHYSICALLY UNCLONABLE FUNCTIONS

(75) Inventors: Richard A Erhart, Tempe, AZ (US);
Gregory L. Dean, Phoenix, AZ (US);
Frank Schwab, Phoenix, AZ (US)

(73) Assignee: Validity Sensors, Inc., San Jose, CA (US)

( * ) Notice: Subject to any disclaimer, the term of this patent is extended or adjusted under 35 U.S.C. 154(b) by 901 days.

(21) Appl. No.: 11/779,215

(22) Filed: Jul. 17, 2007

(65) Prior Publication Data

US 2008/0279373 A1 Nov. 13, 2008

Related U.S. Application Data

(60) Provisional application No. 60/928,864, filed on May 11, 2007.

(51) Int. Cl.
*G06F 11/30* (2006.01)
(52) U.S. Cl. .................................. 380/44; 713/186
(58) Field of Classification Search .................. 380/44
See application file for complete search history.

(56) References Cited

U.S. PATENT DOCUMENTS

| | | |
|---|---|---|
| 4,225,850 A | 9/1980 | Chang et al. |
| 4,353,056 A | 10/1982 | Tsikos |
| 4,525,859 A | 6/1985 | Bowles et al. |
| 4,550,221 A | 10/1985 | Mabusth |
| 4,580,790 A | 4/1986 | Doose |
| 4,758,622 A | 7/1988 | Gosselin |
| 5,076,566 A | 12/1991 | Kriegel |
| 5,109,427 A | 4/1992 | Yang |

(Continued)

FOREIGN PATENT DOCUMENTS

DE 2213813 A1 10/1973

(Continued)

OTHER PUBLICATIONS

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

(Continued)

*Primary Examiner* — Christopher Brown
(74) *Attorney, Agent, or Firm* — Greenberg Traurig LLP; Cecily Anne O'Regan; William C. Cray

(57) ABSTRACT

The invention is directed to a system for securing an integrated circuit chip used in an electronic device by utilizing a circuit or other entity to produce physically unclonable functions (PUF) circuit to generate encryption keys, such as an RSA public or private key. A PUF circuit, according to its name and configuration, performs functions that are substantially difficult to be duplicated or cloned. This allows the invention to provide a unique and extremely secure system for authentication. In operation, the stored parameters can be used to more efficiently and quickly authenticate the device without the need to run the usual more burdensome encryption key generation processes without compromising the level of security in the device. Such a system can be used to substantially eliminate the time to produce encryption keys when a user needs to authenticate the device at power up or other access point.

11 Claims, 8 Drawing Sheets

U.S. PATENT DOCUMENTS

| | | |
|---|---|---|
| 5,305,017 A | 4/1994 | Gerpheide |
| 5,319,323 A | 6/1994 | Fong |
| 5,325,442 A | 6/1994 | Knapp |
| 5,420,936 A | 5/1995 | Fitzpatrick et al. |
| 5,422,807 A | 6/1995 | Mitra et al. |
| 5,456,256 A | 10/1995 | Schneider et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor |
| 5,848,176 A | 12/1998 | Hara et al. |
| 5,850,450 A * | 12/1998 | Schweitzer et al. ............. 380/30 |
| 5,852,670 A | 12/1998 | Setlak et al. |
| 5,864,296 A | 1/1999 | Upton |
| 5,887,343 A | 3/1999 | Salatino et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,999,637 A | 12/1999 | Toyoda et al. |
| 6,002,815 A | 12/1999 | Immega et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,892 B1 | 2/2001 | Angelo et al. |
| 6,185,318 B1 | 2/2001 | Jain et al. |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,317,508 B1 | 11/2001 | Kramer et al. |
| 6,320,394 B1 | 11/2001 | Tartagni |
| 6,333,989 B1 | 12/2001 | Borza |
| 6,337,919 B1 | 1/2002 | Dunton |
| 6,346,739 B1 | 2/2002 | Lepert et al. |
| 6,347,040 B1 | 2/2002 | Fries et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,400,836 B2 | 6/2002 | Senior |
| 6,408,087 B1 | 6/2002 | Kramer |
| 6,473,072 B1 | 10/2002 | Comiskey et al. |
| 6,509,501 B2 | 1/2003 | Eicken et al. |
| 6,539,101 B1 | 3/2003 | Black |
| 6,580,816 B2 | 6/2003 | Kramer et al. |
| 6,643,389 B1 | 11/2003 | Raynal et al. |
| 6,672,174 B2 | 1/2004 | Deconde et al. |
| 6,710,461 B2 | 3/2004 | Chou et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,838,905 B1 | 1/2005 | Doyle |
| 6,886,104 B1 | 4/2005 | McClurg et al. |
| 6,897,002 B2 | 5/2005 | Teraoka et al. |
| 6,898,299 B1 | 5/2005 | Brooks |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,577 B1 | 9/2006 | Tschudi |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 * | 6/2010 | Picca et al. ............... 365/185.09 |
| 7,751,601 B2 | 7/2010 | Benkley |
| 7,843,438 B2 | 11/2010 | Onoda |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 2001/0026636 A1 | 10/2001 | Mainguet |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0089410 A1 | 7/2002 | Janiak et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0181749 A1 | 12/2002 | Matsumoto et al. |

| | | |
|---|---|---|
| 2003/0002717 A1 | 1/2003 | Hamid |
| 2003/0002719 A1 | 1/2003 | Hamid et al. |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen et al. |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka et al. |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0261174 A1 | 11/2006 | Zellner et al. |
| 2006/0271793 A1* | 11/2006 | Devadas et al. ............... 713/189 |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallings et al. |
| 2007/0138299 A1 | 6/2007 | Mitra |
| 2007/0180261 A1* | 8/2007 | Akkermans et al. .......... 713/186 |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1* | 7/2008 | Keane et al. .................. 235/380 |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0267462 A1 | 10/2008 | Nelson et al. |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0119124 A1 | 5/2010 | Satyan |
| 2010/0123675 A1 | 5/2010 | Ippel |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0102567 A1 | 5/2011 | Erhart |
| 2011/0102569 A1 | 5/2011 | Erhart |
| 2011/0182486 A1 | 7/2011 | Valfridsson et al. |
| 2011/0214924 A1 | 9/2011 | Perezselsky et al. |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0044639 A1 | 2/2012 | Garcia |

FOREIGN PATENT DOCUMENTS

| | | |
|---|---|---|
| EP | 0929028 A2 | 1/1998 |
| EP | 0905646 A1 | 3/1999 |
| EP | 0973123 A1 | 1/2000 |

| | | | |
|---|---|---|---|
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1939788 A1 | 7/2008 |
| GB | 2331613 A | 5/1999 |
| GB | 2480919 | 12/2011 |
| JP | 04158434 A2 | 6/1992 |
| JP | 2005242856 | 9/2005 |
| WO | WO 90/03620 A1 | 4/1990 |
| WO | WO 98/58342 A1 | 12/1998 |
| WO | WO 99/028701 A1 | 6/1999 |
| WO | WO 99/043258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/61668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/0104012 A1 | 11/2005 |
| WO | WO 2005/106774 A2 | 11/2005 |
| WO | WO 2005/106774 A3 | 11/2005 |
| WO | WO 2006/040724 | * 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/053797 | 5/2011 |

OTHER PUBLICATIONS

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extra1/afstversl/wsk-i/hgt2008.pdf [retrieved on Mar. 29, 2011] pp. 127-134, paragraph 6.2.

Gassend, et al., "Controlled Physical Random Functions", in Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

Bellagiodesigns.Com (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

Matsumoto et al., Impact of Artificial "Gummy" Fingers on Fingerprint Systems, SPIE 4677 (2002), reprinted from cryptome.org.

Maltoni, "Handbook of Fingerprint Recognition", XP002355942 Springer, New York, USA, Jun. 2003 pp. 65-69.

Vermasan, et al., "A 500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

* cited by examiner

METHOD AND SYSTEM FOR ELECTRONICALLY SECURING AN ELECTRONIC DEVICE USING PHYSICALLY UNCLONABLE FUNCTIONS

RELATED APPLICATION

This application claims the benefit of U.S. Provisional Patent Application No. 60/928,864, filed on May 11, 2007, entitled Method and System for Electronically Securing an Electronic Device Using Physically Unclonable Functions

BACKGROUND

The invention relates generally to technology for electronically securing electronic devices using encryption keys and, more particularly, to systems, devices and methods for securing devices using a physically unclonable function (PUF) circuit(s) to generate encryption keys. As described herein, PUFs are known in the art as circuits, components, processes or other entities capable of generating an output, such as a digital word or a function that is resistant to cloning. For example, a device that has such a PUF circuit embodied therein would be difficult to clone in a manner to generate the same PUF circuit output with another device.

Security in electronic devices has become a major concern of manufacturers and users of such devices. This is particularly true for devices such as computers, personal hand held devices, cellular phones and other devices that contain sensitive information. Developers of electronic devices continuously strive to develop systems and methods that make their products impervious to unauthorized access or use.

At the same time, most all applications have cost limitations that must be taken into account. For example, if a complicated authentication process requiring storage and computing resources were employed on an integrated circuit, the costs incurred may not justify the cost of security accomplished, particularly if the end product were a low cost and mass produced consumer product.

Additionally, the time expended in processing is a concern in many applications. For example, if a fingerprint sensor were employed on a laptop computer, it would need to process computations quickly. Consumers are very particular about convenience of use in any product. So, if a user needs to wait a long period of time for the computer to authenticate the sensor, the product may not be accepted. Moreover, if the user access is a barrier to a time critical operation, such as in a manufacturing process, delayed access resulting from an authentication process could be disastrous. These and other factors are taken into account when designing devices that use such operations.

Many techniques are known for securing electronic devices and applications. Traditionally, in cryptology, at least for the last thirty years or so, RSA (a fanciful acronym derived from the initials of the three developers of the algorithm Ron Rivest, Adi Shamir and Len Adleman of Massachusetts Institute of Technology (MIT)) is an algorithm that is used for what is well known as asymmetric matched key pair encryption, such as public key encryption, and is believed to be secure given sufficiently long keys. Generally, public keys are widely used to encrypt messages and are employed in authentication routines. As is well known in the art of asymmetric matched key pair encryption. Encryption, which may also be used for of authentication requires a private key. As is also well known in the art, decryption may be done utilizing what is known as the public key, distributed in some fashion by the possessor of the private/secret key. In addition encryption may be done using the public key, but decryption may only be done by the possessor of the private/secret key, and not even by other possessors of the public key. Thus, the possessors of the public key may very securely communicate over public communication lines and networks without others being able to decrypt the message. This accepts multiple possessors of the public key being able to decrypt messages encrypted by only the possessor of the private key, which is why the private key is often referred to as an authentication or "signature" key. This algorithm as well as other algorithms and techniques are well known to those skilled in the art, and are widely employed in security and authentication applications. Generally, the following steps can be performed to generate public and private keys:

1. Choose two large prime numbers p and q such that $p \neq q$, randomly and independently of each other.
2. Compute n=pq.
3. Compute the quotient $\phi(n)=(p-1)(q-1)$.
4. For the public exponent e choose an integer e>1 that is coprime to $\phi(n)$.
   I.e., $\gcd(e,\phi(n))=1$.
5. Compute the private exponent d such that the congruence relation $de \equiv (\mod \phi(n))$ is satisfied.

The prime numbers can be probabilistically tested for primality. A popular choice for the public exponents is $e=2^{16}+1=65537$. Some applications choose smaller values such as e=3, 5, or instead. This is done in order to make implementations on small devices (e.g., smart cards) easier, i.e. encryption and signature verification are faster. However, choosing small public exponents may lead to greater security risks. Steps 4 and 5 can be performed with the extended Euclidean algorithm; see modular arithmetic. Step 3 may alternatively be implemented as $\lambda(n)=1$ cm(p-1,q-1) instead of $\phi(n)=(p-1)(q-1)$.

This process of generating encryption keys is a complex and computation heavy process, particularly in routine authentication processes. Also, producing an integrated circuit with advanced security features is expensive using conventional systems and methods. In particular, generating prime numbers is taxing on a system design, requiring processor resources, additional chip space for storage and related circuitry, as well as other resources needed for authentication. Utilizing encryption keys outside an integrated circuit chip, off-chip, is also expensive, requiring additional circuitry and integrated circuit chips. Moreover, performing such processes off-chip is less secure, leaving the authentication process vulnerable to attack.

Also, in practice, conventional authentication processes take time to perform, and often leave a user waiting for the process to complete. For example, in authenticating a typical software application, a user must wait while such a process is completed before access or use is allowed. In many applications, particularly with small electronic devices such as laptop computers, personal data assistants (PDAs), cellular phones, and other devices, this can be burdensome for the device processor as well as for an impatient user. Using the processors and other hardware available in today's small common electronic devices, computing the public and private RSA key pair can take anywhere from 10 to 30 seconds. Even on fast personal computers, times of 1 to 3 seconds are common. Such time delays are undesirable in modern devices.

One approach could be to employ a PUF circuit to more securely provide an output word for use in generating encryption keys. This would eliminate the need for storage of a public or private key on a device. Conventional approaches have addressed such a configuration in prior art publications. One example, U.S. Pat. No. 6,161,213 discloses the use of PUF circuits for component chip identification and other related applications. For example, a PUF circuit could be used to produce a unique word for use in an RSA public/private key generation algorithm so that the component chip always produced the same public/private key pair. There are many problems with this approach. First, consistent production of a number by a PUF circuit is not guaranteed. It is known that uniqueness of a number generated from a PUF circuit in a component chip is possible, but it cannot be produced consistently. In practice, the unique number generated, a digital number, changes upon the excitation of the PUF circuit, and different numbers are produced. As discussed above, using conventional methods, authentication using such means requires significant resources and takes such time and resource consuming processes are not desired in most applications, and are a great impediment to adoption. In addition, using such a number, which practically speaking would be of much smaller size that a prime number typically used in such encryption schemes as RSA, and also without any guarantee that it is a prime number, can significantly reduce the encryption system resistance to unauthorized decryption in the RSA and other such schemes using large prime numbers to generate the encryption keys.

However, conventional technology is not adequate for utilizing such identification. Using conventional methods, the PUF output would be used as a starting point, followed by the application of a complex and very time consuming algorithm to produce the public and private key pairs. Moreover, each time the keys are needed for authentication, the algorithm would need to be repeated, again needing to repeat the same complex and resource consuming algorithm to produce generate the large prime numbers needed for producing the public and private keys. Also, for security reasons, it is not desired to store the key pairs in non-volatile memory. Indeed, the purpose of having a PUF circuit is to eliminate the storage of unique numbers that can be read easily by an intruder trying to bypass or otherwise fool the authentication process. Thus, in a consumer application, if a fingerprint sensor for example, if the delays had to occur upon each authentication, consumer product manufacturers would be reluctant to adopt such a system. Consumers would simply not tolerate such delays. Faster and more convenient systems would be much more easily adopted and accepted.

Thus, there exists a great need in the art for a more efficient means to accurately and efficiently produce asymmetric paired keys, such as RSA keys for component chip and related devices, particularly to avoid the conventional complex and time consuming process used in prior art systems and processes for generating security keys each time a device needs to be authenticated. The need must address the tradeoffs such as the level of security provided, the related cost of manufacture and the resulting speed of operation. As will be seen, the invention provides a means to overcome the shortcomings of conventional systems in an elegant manner.

DETAILED DESCRIPTION

Figure 1A:
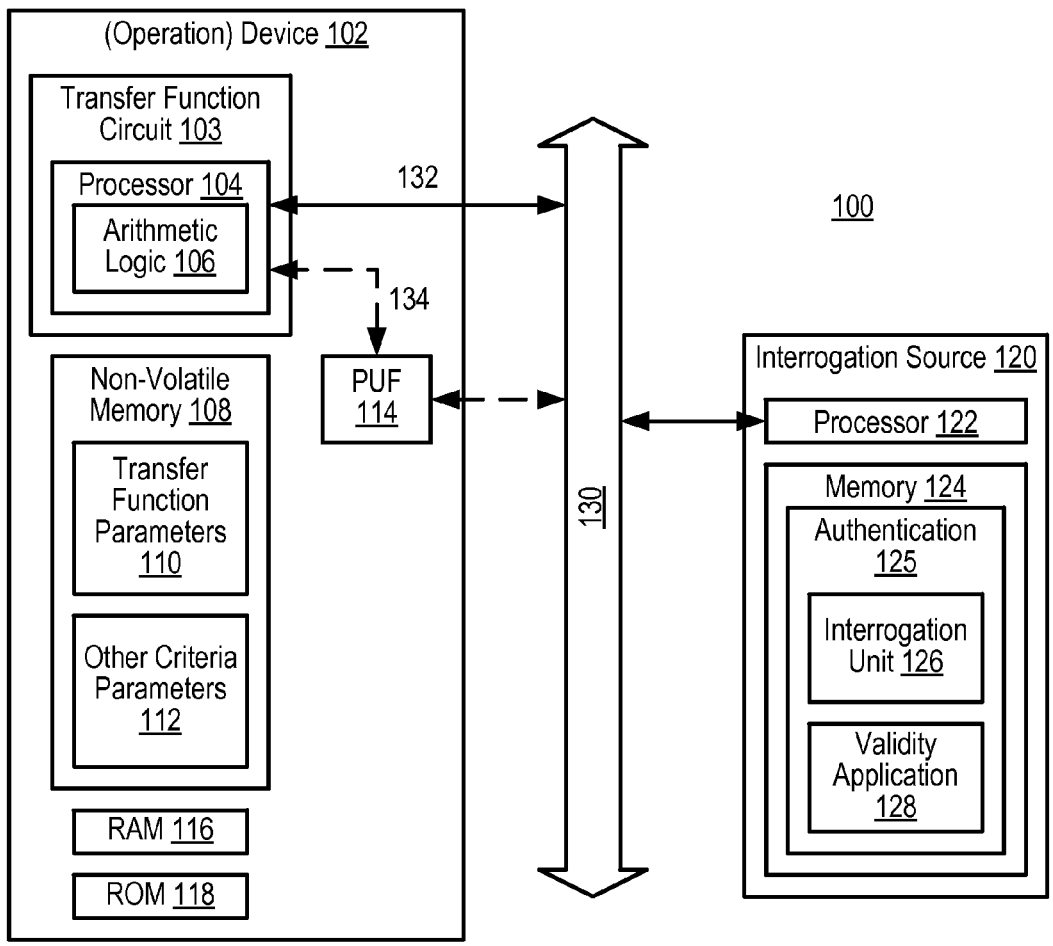
FIG. 1A is an illustration of a device configured with a security system according to the invention.

The invention is directed to a system for securing an integrated circuit chip used in an electronic device by utilizing a circuit or other entity to produce physically unclonable functions (PUFs) to generate a very large prime number for use in generating encryption keys, such as an RSA public or private key. A PUF circuit, according to its name and configuration, performs functions that are substantially difficult to be duplicated or cloned. This allows the invention to provide a unique and extremely secure system for authentication.

As described herein, different embodiments and configurations are possible in devices, systems and methods embodying the invention. The embodiments described here, are only intended as examples, and are not intended as limitations on the spirit and scope of the invention. This includes any type of means to accomplish certain functions that pertain to the invention. Furthermore, to the extent that any means plus function language is used in the claims, they are not limited to embodiments described herein, but contemplate and include any and all types components, devices, systems and method steps known or are to be developed in the future by those skilled in the art. And, those skilled in the art will understand that different configurations are possible without departing from the spirit and scope of the invention, which is defined by the appended claims, future claims submitted during prosecution in this and related applications, and equivalents of such claims.

The prime numbers are is used to develop a transfer function and related data that can be used to generate RSA keys and other security keys and related data used to authenticate the device, without the need to run the burdensome encryption key generation processes and without compromising the level of security in the device. Such processes may be run in a setup mode and only once when the device is manufactured or upon initial power up.

In a setup mode, the PUF circuit can produce a unique ID for the chip, which can be used to obscure the storage of critical security information as well as the transfer function parameters required to access the information. Once the device is setup, the transfer function can then be processed using the critical security information when authenticating the device in an operational mode. Unlike conventional devices, the setup procedure needs to be performed only once, whether it is in production or upon initial power up of the device, in order to establish the parameters needed to be stored in the device. In operation, the stored parameters can be used to more efficiently and quickly authenticate the device without the need to run the burdensome encryption key generation processes of the prior art without compromising the level of security in the device. Such a system can be used to substantially eliminate the time to produce encryption keys when a user needs to authenticate the device at power up or other access point. In operation, the device can quickly and securely produce encryption keys, such as RSA keys, and to perform the related algorithms. The invention allows for non-volatile storage of transfer function parameters that will allow a system to mathematically utilize the PUF circuit output to generate the desired encryption keys.

The invention, very generally, is directed to a system and method for providing individualized security for a device without the need to individually program the device. Since the IC chip has the ability to generate a unique identifier ("unique ID") using the PUF circuit, each device would have a unique security process to authenticate the device. Furthermore, since the unique identifier is different for each device, it provides both a unique and secure means to authenticate the device.

This can have broad reaching applications for many different devices. For example, an MP3 digital music device, such as the Apple™ IPOD™ for example, could have an IC enabled according to the invention, where an authentication is required to authenticate the device before downloading digital music files. According to the invention, if a service were established with the device that required authentication before downloading music files, such a device could be enabled to authenticate itself with a unique authentication generated with the use of a unique ID produced by a PUF circuit before the service would download anything. The invention provides a unique, secure and consistent means to provide such a product and related service. This has been a great concern for music providers, as well as producers of devices that comply with digital rights. This area of interest is known as digital rights management (DRM), where the rights of content owners of music, video and other content are of great concern. There are some conflicting interests, namely the interests of consumers who purchased such content and who wish to freely use and share such content. This is in some contrast to the owners of the rights to such content who have a significant interest in controlling the distribution of such content. According to the invention, an MP3 or equivalent device can be configured for downloading and consuming music, video or other content in a secure manner using a unique authentication process. Many other potential applications are possible, and the invention has wide reaching and useful prospects for new and improved devices having unique and secure authorization cap abilities. And, those skilled in the art will understand that the invention is substantially broad in its application, and many such applications can be developed given this disclosure and skills known in the art.

In operation, a transfer function that utilizes a PUF circuit output or its derivative, such as a selected PUF circuit output and/or a verified PUF circuit output, as discussed below, can be stored on a chip, and is used along with a PUF circuit output to generate encryption keys for use in authentication. The transfer function can be stored during manufacture, or may be generated and stored upon initial power up or initiation by a user in the field, such as a consumer setting up a device or an original equipment manufacturer (OEM) employing a component into a larger product. One example of an OEM application is as a fingerprint sensor having a PUF circuit configured according the invention being installed and incorporated with a laptop computer, for example. A substantial improvement over conventional approaches, the invention provides a means to generate encryption keys. This is a vast improvement over conventional systems and methods, where the security of a device is substantially improved by better securing an authentication process on a chip, obviating operations formerly done off the chip. And, this is true in the manufacture of a device, such as a PUF circuit configured according to the invention in an IC chip, and also in operation. Thus, a device can be configured with a novel and secure authentication process without sensitive security information leaving the device or configured IC chip during manufacture or during operation.

All authentication operations, less perhaps the initial external excitation, may occur entirely on the chip. The prime numbers utilized for the generation of the encryption keys can be generated, processed or otherwise utilized entirely on the chip without need to be transferred or otherwise communicated to a physical location outside the internal IC circuitry. The data for creating the primes from the output of the PUF circuit and the primes themselves, used to create the encryption keys need only be transmitted, transferred, processed or otherwise communicated to components and entities within the IC within which the encryption keys are generated.

After the transfer function is generated and stored, upon subsequent power up operations or other authentication events, the PUF circuit output(s) and the corresponding transfer function and related data can be used in a more efficient manner to authenticate the device. This is accomplished without any compromise in security or cost. In fact, compared to conventional systems and methods in the prior art, security may even be enhanced, and cost reduced. These benefits are realized by virtue of a PUF circuit used to uniquely differentiate each device, and to enable the production of encryption keys such as public and private encryption keys an in a reproducible manner. As will be seen, the invention accomplishes this in an elegant manner, and provides a novel and useful means to uniquely identify a device for authentication purposes.

The embodiments discussed below and illustrated in the drawings are but examples of various embodiments of the invention. In each of these examples, preferred embodiments are discussed and illustrated, where different components and combinations of components are shown and discussed in a cooperative manner in order to explain the features, operations and benefits the invention can provide as embodied therein. Such examples, however, are not intended to be all-inclusive, and other embodiments are possible. Those skilled in the art will understand that other embodiments are possible, and are in fact likely, as different applications require individual trade-offs given their design parameters. Also, different features, functions, operations or components may be incorporated together on a single device, such as an integrated circuit chip having components embedded thereon, or a printed circuit board having various components connected together. Device variations of some functions may exist on-chip, off-chip, or on entirely separate components or indeed separate devices. Such design decisions and related trade-off determinations will necessarily take into account the level of security desired, cost analysis, operation or setup timing and other factors.

Different combinations and permutations of components, features and configurations, whether located in or outside a device, on or off an integrated circuit chip, may be devised according to the invention. Depending on the parameters of a particular application, different combinations may result without departing from the spirit and scope of the invention, which are defined by the appended claims and their equivalents, as well as any claims presented in co-pending applications and their equivalents.

Referring to FIG. 1A, very generally, the device 102 is configured with a security application that enables authentication according to the invention. This application involves and includes both hardware and software components for combined use in authentication of the device 102. A transfer function circuit 103 is configured to perform operations that define the transfer function used for producing encryptions keys unique to the device 102. A PUF circuit 114 is configured to produce a PUF circuit 113 unique ID output word upon excitation, where the unique ID output word produced embodies a unique identification of the PUF circuit 113 that produces the PUF circuit 113 output by mere virtue of its makeup and manufacture. This PUF circuit 114 output (or as noted below, a derivation from the PUF circuit 114 output) is then processed along with a transfer function value to produce an encryption key, such as public and private RSA keys or other types of encryption keys for use in an authentication process. The transfer function may be an algorithm, perhaps as simple as addition of values, where the transfer function combines offset values previously generated by authentication operations, examples of which are discussed herein. These values may be pre-computed, concurrently computed or subsequently offset values, either within the same circuit, or computed remotely. A processor 104 may be configured with arithmetic logic 106 or other components for processing transfer function parameters, which are stored in nonvolatile memory 108, including security parameters and other criteria parameters discussed below.

At its origin, the PUF circuit 114 is manufactured under standard design rules to conform with the design of the IC device within which it is incorporated. Upon a first initiation, the device is configured in a setup mode, where resource consuming computations are performed. In this setup mode, offset values are generated that, when combined with the PUF circuit 114 output, can be used to generate encryption keys whenever authentication is desired. This can have wide reaching application wherever and whenever authentication is desired, whether it be for proximal or remote access authorization to data, applications, security systems, or other secured entities; for use authorization of devices, hardware, software or other entities; authentication of authorized devices for use alone or in combination with other devices, such as with a fingerprint sensor that needs to be authenticated before it can be used as an access device for a secured electronic device such as a laptop computer; or for any other process where authorization is desired.

Examples of devices that could be manufactured or otherwise accessorized with devices or entities configured according to the invention include personal desktop and lap top computers, cellular telephones, content recording devices such as MP3 players or the equivalent, batter packs, ink cartridges, devices involving DRM and content downloads, smart cards, access identification cards, and other devices where stored data needs to be protected. Such devices may perform financial transactions, internet related transactions, and other transactions where, again, stored or otherwise processed data is desired to be protected. In conventional prior art devices, such computations would be required upon each instance of authentication. In such prior art devices, resources are strained and much time is required to perform such authentications. In modern devices, power and computational resources are very restricted, and an authentication processes can greatly affect the ability for a device to be manufactured and operate within such restrictions. If a device is not able to be manufactured or operate within such restrictions, it may not be accepted or adopted in particular products. However, if a device could operate within such restrictions, it could be widely adopted, becoming ubiquitous in one or many product areas.

For example, electronic memory storage may be embedded on an integrated circuit to reduce operation time and increase security. In another application, memory may exist on a separate integrated circuit, off-chip, to save costs by storing security parameters, offsets or related data along with other information. According to the invention, in many applications, such tradeoffs will be substantially obviated given the unique and powerful features provided. Nonetheless, those skilled in the art will understand that, given this specification, different embodiments can be developed using conventional knowledge and skills without departing from the spirit and scope of the invention as defined by the appended claims and their equivalents. Thus, those skilled in the art will understand that the determination of which exact implementation or embodiments are preferred will depend on the given application.

In a setup mode, the PUF circuit 114 can produce a unique ID for the chip, which can be used to obscure the storage of critical security information as well as the transfer function parameters required to access the information. Once the device is setup, the transfer function can then be processed using the critical security information when authenticating the device. Unlike conventional devices, the setup procedure needs to be performed only once, whether it is in production or upon initial power up of the device, in order to establish the parameters needed to be stored in the device 102. In operation, the stored parameters can be used to more efficiently and quickly authenticate the device without the need to run the burdensome prime number generation processes without compromising the level of security in the device 102. Such a system can be used to substantially eliminate the time to produce encryption security keys when a user needs to authenticate the device at power up or other access point. In operation, the device 102 can quickly and securely produce security keys, such as RSA keys and signature keys, and to perform the related algorithms. The invention allows for nonvolatile storage of transfer function parameters that will allow a system to mathematically utilize the PUF output to get the desired output.

The invention is directed to a system for securing an integrated circuit chip used in an electronic device 102 by utilizing a circuit 114 or other entity to produce physically unclonable functions (PUFs) for use in generating encryption keys, such as an RSA public or private key. There are many applications for such a circuit 114, including authenticating a software application associated with the chip, giving access to secure information from the device 102 having the chip (and accordingly excluding unapproved devices from access to the information), and many other applications As an example of a device 102 that can greatly benefit if configured according to the invention, a fingerprint sensor with a small embedded processor could utilize a PUF circuit 114 to enable a remote computer to verify the identity of the sensor to assure that no one had replaced the sensor with another. The remote computer could further assure that the original sensor had not been compromised, and still further could verify that a transmitted fingerprint was sent by that sensor. This could assure that no one had injected a false fingerprint into the communications channel used by the sensor and the remote computer. This provides a highly secure identity verification method that would be useful in many applications, including for example online banking transactions to verify that a funds transfer was being initiated by the owner of the funds. In another example, the invention could be incorporated in security applications to authenticate a sensor and the corresponding communications link before granting access to a fingerprint-secured area. Such a sensor can be used in many applications, such as laptop computers, smart cards, cellular phones, etc.

In one embodiment, in a device 102 that has no programmable storage, the invention can provide a device, system and method to store the transfer functions at a remote location. Such a remote location may be separate memory, such as random access memory (RAM), a separate cache storage, or other type of memory. Utilizing other features of the invention, such as PUF circuitry, authentication can be achieved with significant security.

The invention can extend to many other applications where security in authentication is desired. In the fingerprint sensor example, employing the invention in the sensor with the small embedded processor would greatly reinforce the security of the sensor. This is done by configuring a secret key and a public key using a unique and consistent output from the PUF circuit 114. Where the sensor is incorporated in another system, the invention can help better secure such a system by requiring compatibility with a particular sensor product. This is done by obscuring a product signature using the PUF circuit 114 and related security information stored on the device 102. The signature would be the same for all products manufactured together by a company, and would verify that the product incorporated in the system was indeed manufactured by a certain company. This would add security for a system by preventing unauthorized access to devices.

The invention utilizes a PUF circuit 114 in a new and unique way from conventional applications. The PUF circuit 114 can produce a unique ID for the chip, which can be used to obscure the storage of critical security information and to greatly reduce the time required to produce encryption keys, such as RSA keys. The invention allows for permanent non-volatile storage of a transfer function that will allow a system to mathematically utilize the PUF circuit 114 output to produce the desired encryption keys. In the case of generating RSA key pairs, the PUF circuit 114 can be used to produce a unique output, and the keys can then be generated. A transfer function can then be stored in nonvolatile memory that would enable for rapid mathematical reproduction of the public and private keys, given the PUF circuit 114 output. This allows reproduction of the keys without the lengthy process of the regeneration of prime numbers needed to produce the keys generation. Moreover, it enables this without any compromise to security. Even though the transfer function parameters are stored in nonvolatile memory, the output of the PUF circuit 114 is still unknown. And, therefore, the encryption keys cannot be reproduced without the PUF circuit 114 output. Thus, the encryption keys cannot be regenerated without the actual PUF circuit 114 output. As a result, another device that does not have the actual PUF circuit 114 would not be able to generate the keys and cannot artificially generate the keys without the actual PUF circuit 114. Given the possible variations in a PUF circuit 114 output for different PUF circuits, even if formed of the same components, it is virtually impossible to reproduce the PUF circuit 114 output, and thus it would be equally as impossible to reproduce the encryption keys.

In one embodiment, the invention provides for a system and method for generating encryption keys for use in electronically authenticating or locking and unlocking a device, software application, or other secured entity, where an encryption key can be generated by a PUF circuit 114, and separate transfer function parameters can be stored in non-volatile memory. Together, these can be used to authenticate a device in a novel and useful manner, with an increased level of security compared to conventional systems and methods. The encryption keys produced by using a PUF circuit 114 is physically unique to the IC in the device 102, and does not need to be stored in memory, and thus can not be easily misappropriated. It must be derived by interrogating the device 102 to provoke an output signal from the PUF circuit 114 that is not determinative from the physical circuit components. The transfer function parameters can be stored in nonvolatile memory, and can be retrieved in nonvolatile memory and combined with the unique ID from the PUF circuit 114 to authenticate the device 102 for a user. Since the transfer function parameters would be useless for authenticating the device 102 without the unique ID, and since it is derived by different means, greatly improved security is provided for authenticating a device 102.

According to the invention, the device 102 has installed on it a PUF circuit 114 or the like incorporated onto an integrated circuit (IC). The PUF circuit 114 is configured to generate a[[n]] unique ID number that identifies the IC in which it is installed. Generally, the PUF circuit 114 may be made up of a plurality of identification cells formed within the IC, where each cell has an output that is a substantial function of random parametric variations in the IC and thus unique to the IC by virtue of its manufacture. A measuring device may monitor the output of the identification cells to generate the unique ID that is unique to the device 102, where the unique ID is also a substantial function of random parametric variations in the identification cells forming the PUF circuit 114. It is known to those skilled in the art that there are enough manufacturing process variations across ICs produced in the same process to uniquely characterize ICs. It has also been proven that reliable authentication can be performed using unique ID words derived from such unique characterizations. The invention exploits such knowledge, and utilizes this to provide a novel and useful method of authenticating a device 102 or application using a PUF circuit 114.

A stimulation circuit configured to send stimulation signals to the PUF circuit 114 can provoke a unique ID output signal. For example, a signal can be transmitted to the PUF circuit 114, which would in turn generate a response signal that is unique to the PUF circuit 114 according to its unique physical characteristic parameters that are created upon the manufacture of the IC on which the PUF circuit 114 resides. More details on this process are discussed below. In addition to the unique ID, according to the invention, a transfer function can be identified or otherwise derived. This transfer function can be used along with the unique ID to authenticate the device 102 by way of the IC containing the PUF circuit 114. This transfer function can be stored in nonvolatile memory for subsequent use.

Thus, in operation, using the unique ID the transfer function can be determined when the IC is manufactured, and can be associated with a device 102, such as a laptop, smart card, cell phone, or other device. Upon power up of the device 102 by a user, the device 102 can be interrogated for the unique ID, which can then be used to generate encryption keys for identifying the device 102. The resulting unique ID can be used along with the transfer function to identify and verify the device 102 to give a user access. Thus, the invention provides a system and method for providing a unique ID and transfer function for authenticating a device 102, where the unique ID is physically unique to the IC in the device 102, and does not need to be stored in memory. The unique ID must be derived by interrogating the device 102 to provoke an output signal that is not determinative from the PUF circuit 114 physical circuit components, that are created upon manufacture of the IC that is incorporated in the device 102. The transfer function can be stored in nonvolatile memory. Thus, the transfer function can be retrieved in nonvolatile memory, and combined with the unique ID to authenticate the device 102 for a user. The unique ID is not stored in memory, and thus not susceptible to misappropriation. The transfer function, even if it were misappropriated, would be useless for authenticating the device without the unique ID, which is derived by completely different means, and not simply retrieved from storage.

Referring again to FIG. 1A, a diagrammatic view of one embodiment 100 of the invention is illustrated. There are two general aspects of the system and method 100 of the invention. One aspect is implemented and performed during production of an IC used in a device 102, and another is the product of manufacture embodied in the device 102 that is used in authenticating the device 102 during normal operations of the device 102. The former, illustrated as device 102 in FIG. 1B, may only need to be performed once, and may be part of a manufacturing process for the IC, or could also be performed upon initial power up of a device 102 or other authentication process of the device 102. The latter, illustrated as device 102 in FIG. 1A, is employed each time a user powers up or otherwise initiates the device after the unique ID and transfer function have been established, and authentication is performed to identify the device 102 and authorized operation by a user. The authentication may include identifying a subject device 102 from a remote device, which would interrogate the subject device 102 by sending a signal that excites or otherwise enables the subject device 102 to identify itself. The signal sent by the remote device may include encrypted data sent via a communication channel sent in order to provoke a response by the subject device 102, such as a response signal embodying a public key, discussed in more detail below. The device 102 may be a laptop computer, a personal data assistant (PDA), a cellular telephone, or any other device for which authentication is desired prior or operation for security, authentication of a system or process to be used by the device whether located on the device or remotely, or for other purposes.

For example, manufactures that sell security devices or components for use in combination with other components, such as the fingerprint sensor discussed above that is sold for use with other devices to secure access, have an interest in authenticating the component devices. This prevents counterfeit devices that may be used to penetrate the security of a device. Also, manufacturers that sell software may want to authenticate the device on which the software is used to ensure that the software is not copied for unauthorized use on other devices. Often, manufacturers produce and sell software programs and applications to users for individual use, and others are sold as enterprise packages for use by multiple authorized users within an organization Such software manufacturers have a strong interest in ensuring that such programs are not copied onto unauthorized devices, such as laptops. The invention provides a means for manufacturers of such software to authenticate users by particular devices, preventing unauthorized copying or use. Secured devices configured according to the invention have features that allow for their highly secured authentication adding to the integrity of the security devices or components by making them more secure from counterfeits or unauthorized breaches or attacks.

The device 102 includes processor 104 configured to perform operations by executing software and performing operations in arithmetic logic 106. The processor may be a dedicated microprocessor implemented on an integrated circuit, a general-purpose computer, or may be simple logic circuitry configured to perform necessary operations for authentication of the device, and may include other operations related to general or specific operations of the device. According to the invention, the operations required for authentication have been greatly simplified for normal device operations where authentication is performed. Thus, less sophisticated processing circuitry and related software are required to perform such processes. Setup procedures perform the resource intensive security algorithms that, prior to the invention, were required each time a device was authenticated. According to the invention, these operations only need to be performed once upon setup. The setup procedure may be performed once upon the manufacture of the device or up on initial powering up of the device.

Thus, for example, a user may purchase a device such as a laptop or desktop computer for personal use and, upon first powering up the device, the device may perform the authentication computations in a setup mode. This may take considerable time at first, but, according to the invention, the user would only need to be inconvenienced once. The setup operations produce transfer function parameters that are stored in memory. After setup operations are complete, more streamlined operations utilizing the stored transfer function parameters are used along with the output from a PUF circuit 114 for routine authentication procedures. As discussed in more detail below, these parameters generated at setup are used during normal authentication operations, and by much of the same circuitry, to generate encryption keys such as RSA public and private keys. These encryption keys can be used to authenticate the device for various purposes.

Alternatively, the intensive setup procedures may be performed periodically, either according to a time or use table or upon predetermined events. This may occur when a device is reintroduced in a market, or if there is a change in security codes or operations as determined by a manufacturer or mass user of a device to maintain the security and integrity of such devices produced by the manufacturer. Those skilled in the art will understand that, depending on the application, different security and maintenance procedures could be developed and maintained according to the invention by a manufacturer in order to produce products with optimum security.

Still referring to FIG. 1A, execution of software causes operations to occur in response to signals generated by the processor 104. Software is stored in nonvolatile memory 108, including transfer function parameters 110 which, along with a word generated from the PUF circuit 114, are used to provide a encryption keys for authentication. The nonvolatile memory 108 further includes authentication interface 112 for enabling the device to be authenticated by an outside entity, or to otherwise be authenticated for use. The interface may be software code that, when executed by a processor of some type, is configured to enable communication between the subject device and a remote authenticating device. Alternatively, the interface may include hardware or a combination of hardware and software. Other critical parameters may be included in the interface 112 and may be stored in nonvolatile memory 108, including parameters that disable the PUF circuit 114 output from being presented on the IC external interface; parameters that disable the critical parameters in the nonvolatile memory from being presented on the IC external interface; and parameters that subsequently disable the critical parameters from being stored or overwritten from the IC external interface. The system may further include random access memory (RAM) 116 and/or read-only memory (ROM) 118 memory for processor 104 and/or device 102 operations.

In operation, an outside source or proximal interrogation source 120 may interrogate the device 102 for security and/or authentication. Interrogation source 120 includes a processor 122 for performing operations by executing software stored in memory 124. Software man may include authentication unit 125 configured to cause the processor 122 to perform methods and processes for authenticating device 102. Interrogation unit 126 is configured to enable the processor 122 to interrogate the PUF circuit 114 in order to provoke the PUF circuit 114 to generate a unique ID word in response. Device application 128 is configured to cause the processor 122 to perform authentication operations, such as validity operations, for example, in order to determine whether the device 102 is authentic.

Figure 1B:
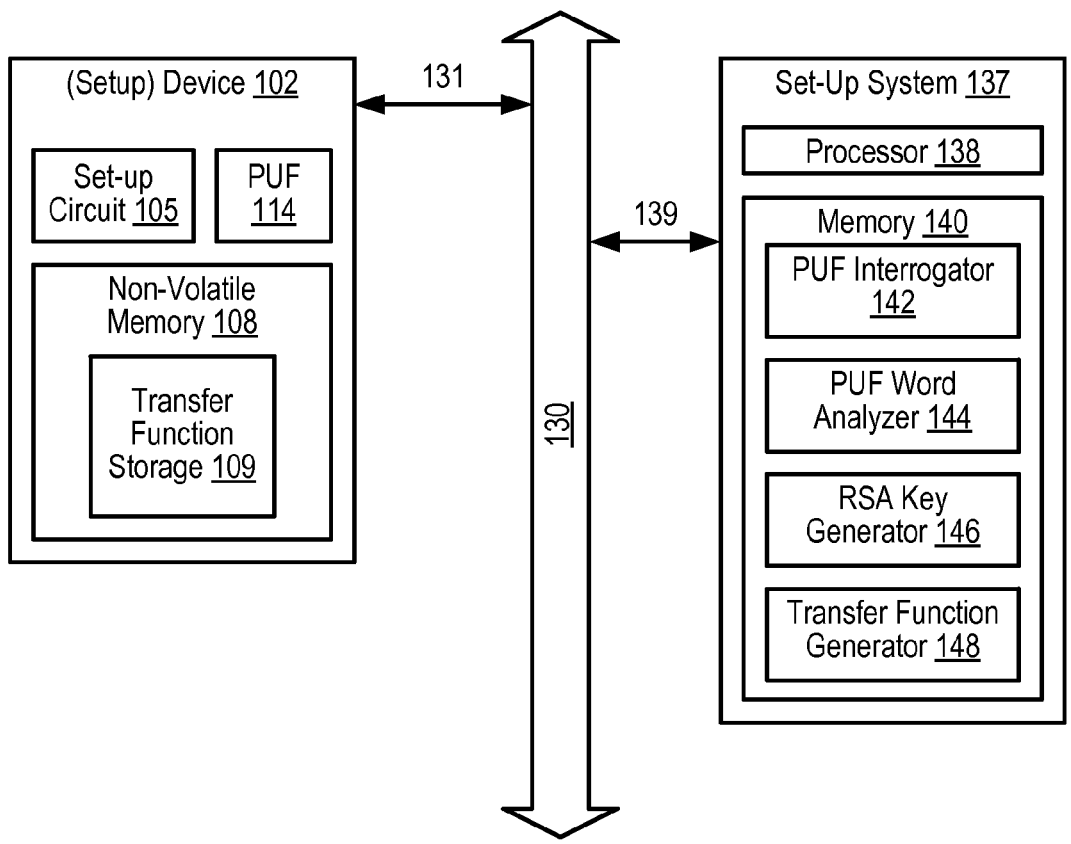
FIG. 1B is an illustration of a set up system for a device configured with a security system according to the invention.

Referring to FIG. 1B, a system 101 is illustrated for setting up the device 102, including determining a transfer function, so that the device 102 can be efficiently authenticated each time it is powered up by a user or otherwise initiated. The components of the device 102 utilized in this process includes the PUF circuit 114, which is a substantially permanent entity configured to generate a consistent unique ID word for identifying the device 102. A setup circuit 105 may be a separate entity all of its own, or may include the PUF circuit 114. In a preferred embodiment, the setup circuit 105 and the transfer function circuit 103 (FIG. 1A) coincide in the device 102, and some components are shared between the processes. Nonvolatile memory 108 includes transfer function storage 109 for storing the transfer functions generated or otherwise derived by setup system 137. By virtue of its creation during the manufacture of the device, the PUF circuit 114 output is unique to the device 102 within the design and manufacturing processes used to produce the PUF circuit 114. Since the manufacturing process operations within certain parameters, and since each device 102 is produced separately, each PUF circuit 114 is unique within certain tolerances according to the circuit parameters. Therefore, the individual unique ID produced by each PUF circuit 114 is unique, or indeed randomly determined by the manufacturing process. However, the unique ID word for each PUF circuit 114, once established, is consistently reproducible for authentication purposes. The unique ID word generated by the PUF circuit 114 is unique to each PUF circuit 114 produced by the manufacturing process.

The setup system 137 includes a processor 138 that is configured to perform setup operations by executing software stored in memory 140. PUF circuit 114 interrogator unit 142 is configured, when executed by the processor 138, to stimulate or otherwise interrogate the PUF circuit 114 via communication link 139 to network or bus connection 130, and also via device link 131. In return, the PUF circuit 114 sends a unique ID word for use in the setup process performed by the setup system 137. In practice, this may be performed multiple times to ensure an accurate reading of the unique ID word to ensure a fair reading and testing for authentication. The PUF circuit 114 output unique ID word analyzer circuit 144 is configured to analyze the PUF circuit 114 output unique ID word to ensure that the output is that of a consistent word that can be duplicated from the PUF circuit 114 for authentication purposes. The RSA key generator unit 146 is configured to generate large prime numbers that can be consistently reproduced in subsequent initializations by a user for authentication. Transfer function generator 148 is configured to derive or otherwise generate a transfer function that can be used in conjunction with the unique ID word generated by the PUF circuit 114 to authenticate the device 102.

Once set up, the device 102 may be interrogated by a remote device for authentication and would produce the encryption keys, such as an RSA public and private key, or other types of security keys. In practice, it may be practical to run the authentication process in order to test whether the setup process properly set up the device 102. Then, subsequent authentication processes could be performed using the improved system within the device 102, without the need to perform the burdensome processes of regenerating the large prime numbers needed to regenerate the encryption keys.

Figure 2A:
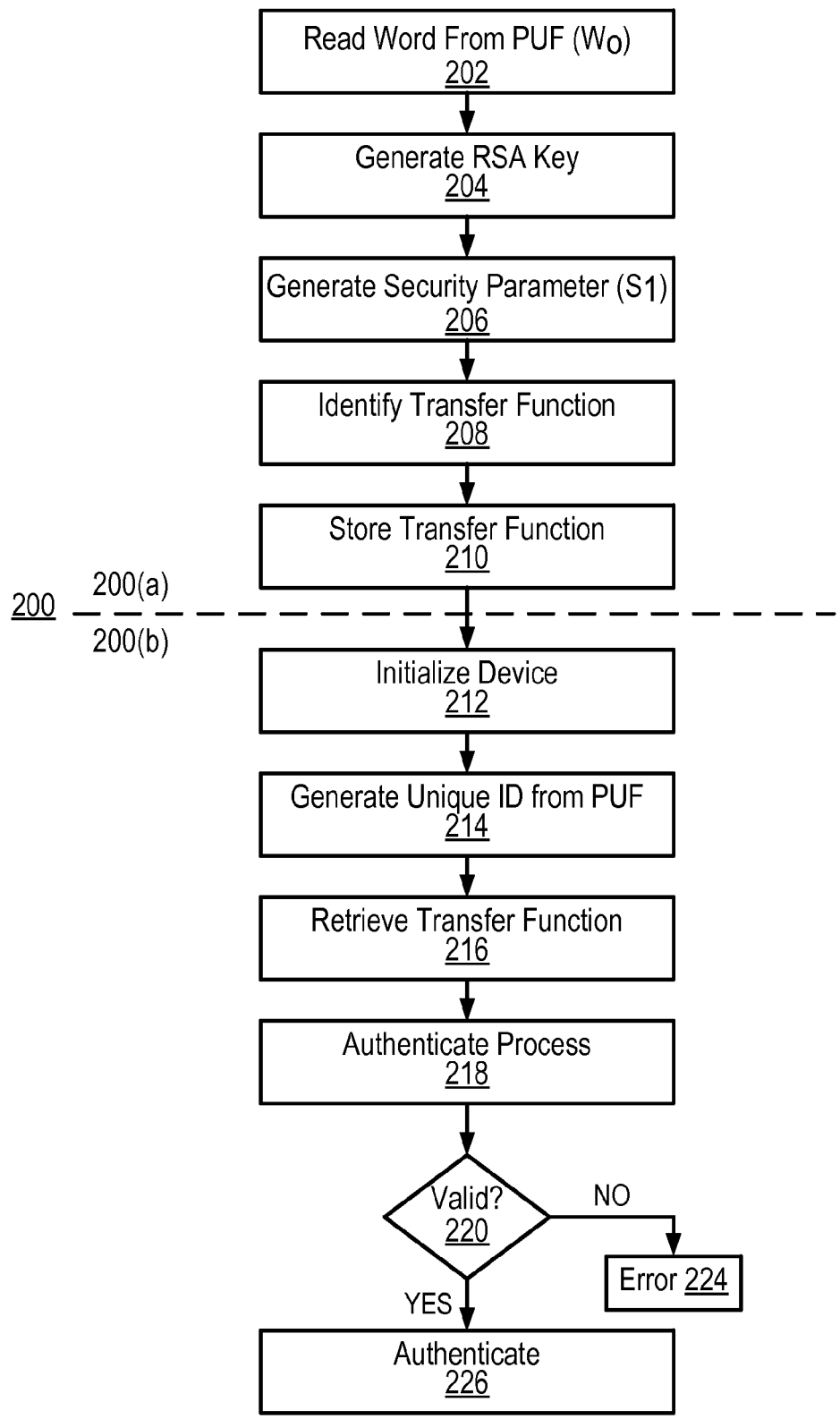
FIG. 2A is a flow chart illustrating a setup and authentication method according to the invention.

Referring to FIG. 2A, one embodiment of a method 200 configured according to the invention is illustrated. The process 200 is divided up into two parts, the setup process 200(a) and the operations process 200(b). In step 202, a unique ID word is read from a PUF circuit 114. This may be done by internally or peripherally stimulating the PUF circuit 114 to produce a unique ID word in response. In step 204, an RSA key is generated by using the unique ID word. In step 206, a security parameter is generated, which is part of the authentication process according to the invention. In step 208, a transfer function is identified or otherwise derived, this is discussed further below. In step 210, the transfer function is stored in nonvolatile memory. This process may be performed upon initial power up or initialization of the device 102, or in production before the device 102 is ever used or sold. Either way, the cumbersome process of establishing large prime numbers used to generate the encryption a security keys and thereby deriving transfer functions to be applied to the PUF circuit 114 output unique ID word is only required once. Afterwards, the device 102 can be authenticated by simply using the PUF circuit 114 output unique ID word and the transfer functions stored in memory.

The rest of the process 200(b) illustrated in FIG. 2A is indicative of the reduced process then required to authenticate the device 102. In step 212, the device 102 is powered up or otherwise initialized. In step 214, a unique ID is generated by the PUF circuit 114. This may be accomplished by an interrogating entity stimulating or otherwise interrogating the PUF circuit form a proximal or external device. In step 216, the transfer function is retrieved from nonvolatile memory. In step 218, the authentication process is initiated. This may include adding, subtracting or otherwise processing the PUF security key and the transfer function to compute an RSA key. This RSA key may be compared against a master key value in order to determine whether the device is authentic. It is then determined whether the device is valid. If not, an error signal may be generated in step 224. If the device is valid, then the device is authenticated in step 226.

Figure 2B:
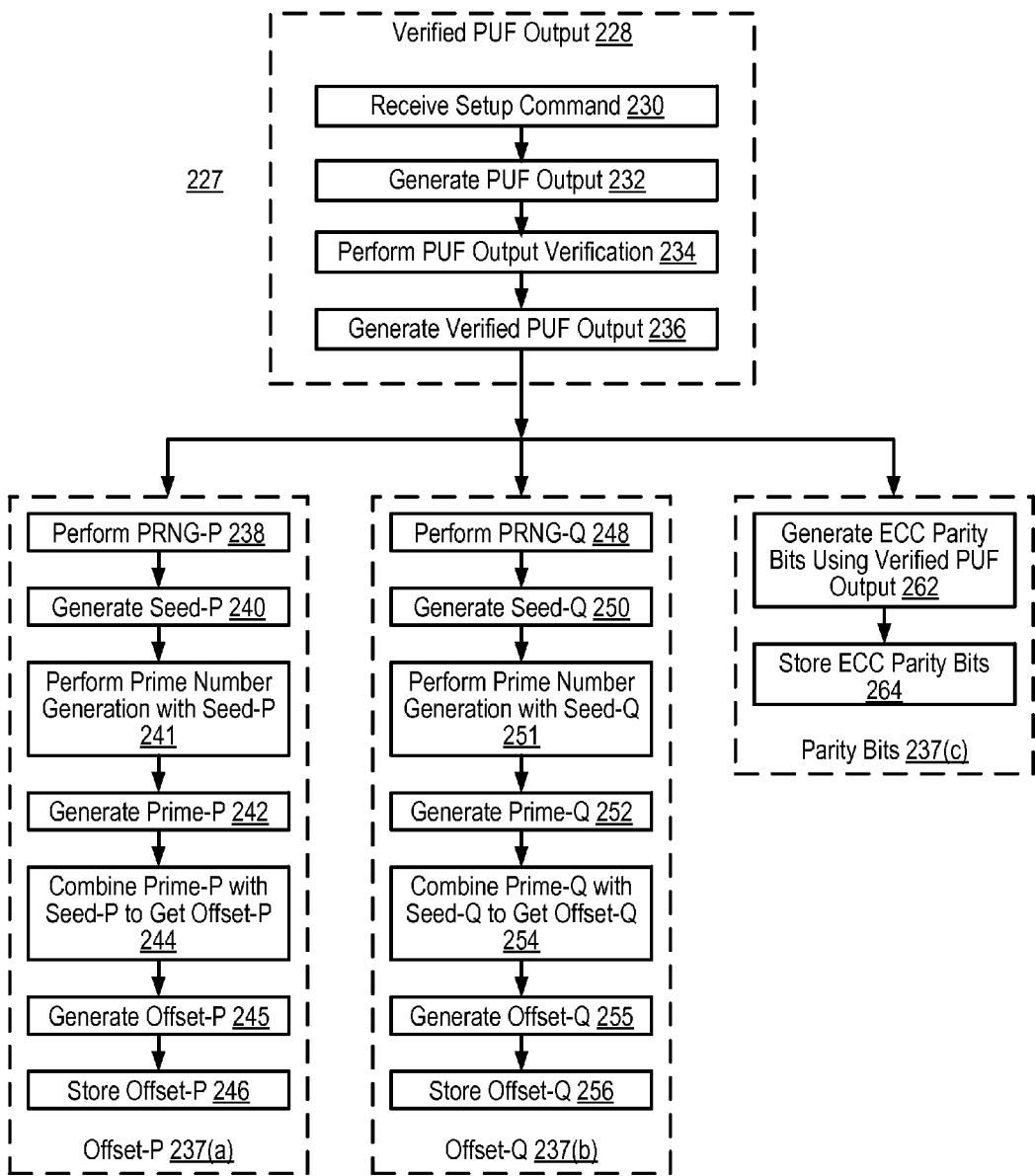
FIG. 2B is a flow chart illustrating a set-up method according to the invention.
Figure 2C:
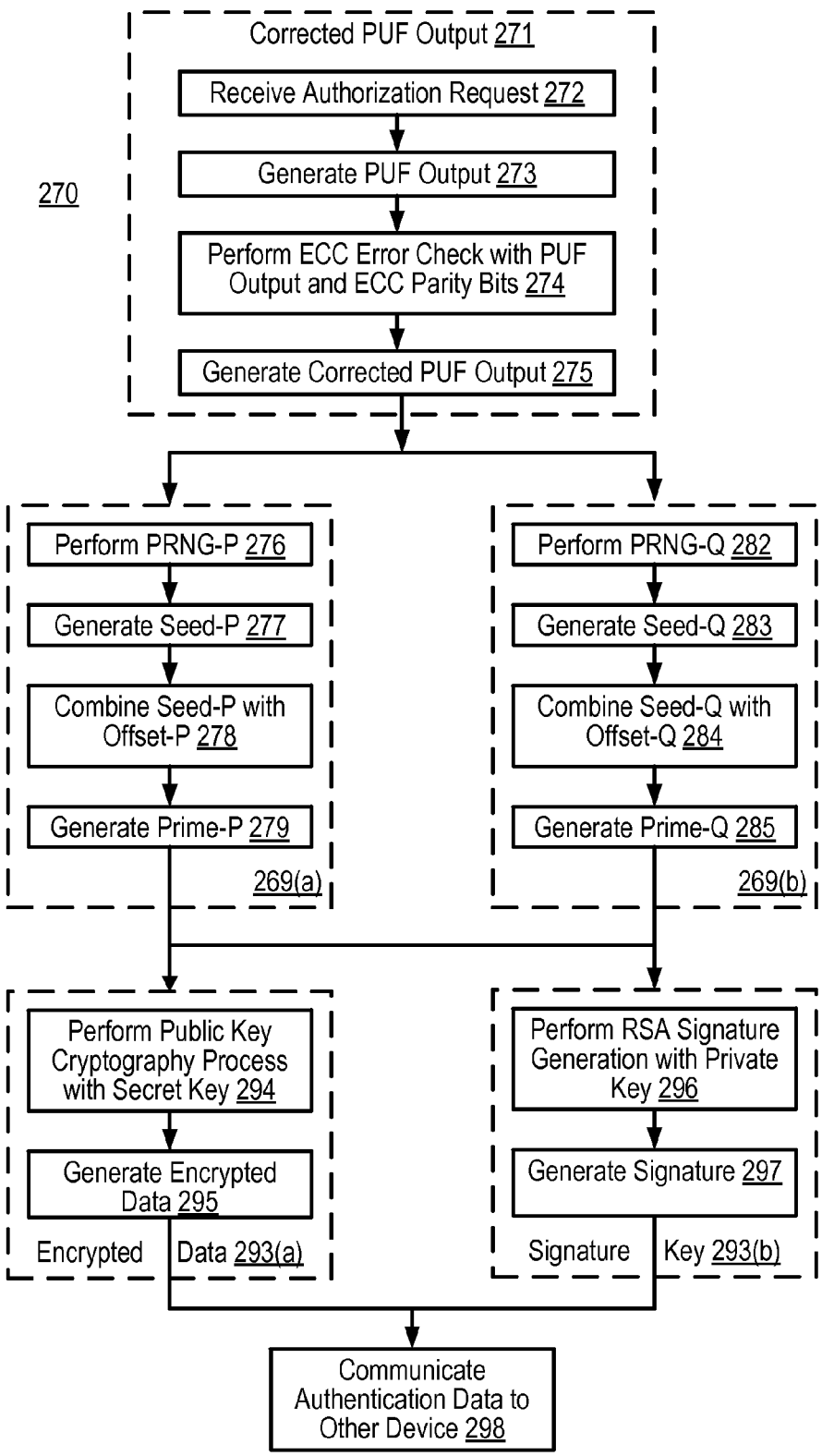
FIG. 2C is a flow chart illustrating an authentication method according to the invention.

Referring to FIGS. 2B and 2C, a more detailed flow chart of the setup mode process is illustrated in FIG. 2B, and a more detailed flow chart of the operational mode process is illustrated in FIG. 2C. These functions of each the setup mode and the operational mode are described further below in the context of the hardware circuitry and software in the particular embodiments of FIGS. 4A and 4C. However, the process described here is in no way limited to the particular embodiments described herein, but extend to any setup or operational circuitry or software the embodies the functions described herein.

Referring first to FIG. 2B, the process 228 is first performed to produce a PUF output, specifically a verified PUF output for use in setting up the device according to the invention. In step 230, a command for setup is received. In step 232, a PUF output is generated, which is an electronic signal that embodies a unique security word that is unique to a PUF, whether it is a PUF integrated circuit or other entity. For the setup process, it is desired to increase the integrity of the security key generation process so that substantially consistent parity bits and transfer function parameters (such as transfer function offset values) are generated. Accordingly, more consistent security keys would result. For this, a consistent PUF output is preferred.

In the next step, step 234, a selection process is performed to produce a refined PUF output. It has been discovered that a PUF output can be reliably repeated using statistically based techniques. In general, a PUF output can be repeatedly sampled, and simple statistical processing can be employed to arrive at a consistent number. This process can be done both in the setup process and operation process to substantially ensure that the most accurate PUF output is read for use in setting up and establishing the parity bits and the transfer function parameters, such as the offset values discussed herein. For example, a PUF output can be generated 3 or more times, and the outputs can be compared to find consistent values. If a PUF word is 448 bits for example, a subset of each word can be used to compare to other words to determine consistent outputs. In practice, certain bits can toggle back and forth from one PUF output to the next generated output. Given proper statistical analysis, substantially secure authentication can be accomplished.

When reading a PUF output, most bits can be stable and consistently produce the same output word. A few bits, however, may change or toggle from one read to another. In selecting the PUF output, a process can be invoked that ensures a more consistent PUF output. For example, the PUF output can be read a number of times, such as 5 times for example, and a statistical algorithm can be performed to determine which PUF output is to be used in subsequent processes. This improves subsequent error correction processes, and improves the overall authentication process and sub-processes described herein. The verified output is then generated in step 236. Alternatively, the selection process may occur after the error correction. Those skilled in the art will understand that different configurations are possible without departing from the spirit and scope of the invention, which is defined by the appended claims and their equivalents.

From here, the verified PUF output is used to generate the different security keys and parity values, specifically in this example embodiment of the invention, offset-P in process 237(a), offsets in process 238(b), parity bits in process 237(c), and offset-S in process 237(d). Each of these outputs is used to generate values needed to produce security keys, including but not limited to the RSA public and private keys and signature keys described herein. These values are derived during the setup process, and offset values and parity bits are stored in nonvolatile memory for use in generating security keys during the operational mode of the device. According to the invention, the burdensome algorithms for producing security keys are performed during the setup process so that they do not need to be performed each time the device is authenticated. When the offset values and parity bits are established in the nonvolatile memory, security keys can be produced using the PUF output together with these values in simple operations that do not required extensive processing by a data processor. This makes the process fast, less burdensome on device resources, and, given the novel manner in which the security keys are produced, the unique process does not compromise security of the device.

First, to produce offset-P in process 237(a), a pseudo random number generation process is performed in step 238 for use in generating the offset-P, which is used to produce a private key. Those skilled in the art will understand that different types of pseudo random number generation processes exist and can be used in a device configured according to the invention. In this process, a seed-P is generated in step 240, which is a numerical value generated from the pseudo random number generator. Using this seed value, a prime number generation process is performed in step 241 with a prime number generator. A prime number is generated in step 242. Those skilled in the art will understand that different types of prime number generation processes exist and can be used in a device configured according to the invention. Typically, a number is chosen, and it is tested whether it is prime. If not another number is chosen, sometimes by adding a value to the number, and testing it again in an iterative process. Once a number is found that is prime, it is used. In step 244, the prime number generated in step 242 is combined with the seed-P value to produce an offset-P. This may be done with a simple addition or subtraction logic circuit, a multiplier circuit, or other arithmetic unit. The offset-P is generated in step 245, and stored in step 246, such as in nonvolatile memory, on-chip memory, or other memory storage.

Next, to produce offsets in process 237(b), a pseudo random number generation process is performed in step 248 for use in generating the offset-Q, which is used to produce a public key. A seed-Q is generated in step 250, which is a numerical value generated from the pseudo random number generator. Using this seed value, a prime number generation process is performed in step 251 with a prime number generator. A prime number is generated in step 252. In step 254, the prime number generated in step 252 is combined with the seed-Q value to produce an offset-Q. This may be done with a simple addition or subtraction logic circuit, a multiplier circuit, or other arithmetic unit. Similar to the offset-P value, the offset-Q is generated in step 255, and stored in step 256, such as in nonvolatile memory, on-chip memory, or other memory storage.

Next, to produce parity values, such as parity bits, process 237(c) is performed, where the ECC parity bits are generated in step 262 using the verified PUF output from step 236. Those skilled in the art will understand that many different methods of parity bit generation exist, and the invention is not limited by any particular method. Examples include BCH code (Bose, Ray-Chaudhuri, Hocquenghem error correction code), and other methods. This value is then stored in step 264, such as in nonvolatile memory, on-chip memory, or other memory storage.

Then, offset-S is generated in process 237(d), for use in producing a signing key, and ultimately a product signature key. In step 258, the verified PUF output is combined with the symmetric encryption key, which is provided by the setup equipment of the device. This produces offset-S, which is then stored in step 260, such as in nonvolatile memory, on-chip memory, or other memory storage.

Thus, the three offset values, offset-P, offset-Q and offset-S are produced in the process 227 and stored in memory. Also, the parity values are produced and stored in memory as well. These offset values and parity values are used by the transfer function circuit to produce security keys, such as a private RSA key, a public RSA key and a product signing key. The encrypted signing key may be produced by a process built into the firmware or other mechanisms in the IC chip. This could be produced during manufacturing, provided post-manufacturing, or by other processes or methods. This is discussed further below in connection with FIGS. 4A and 4B. Those skilled in the art will understand that these functions and features can be provided in various ways.

Referring to FIG. 2C, a more detailed flow chart of the operational mode process 270 is illustrated. The process first includes the verified PUF output process 271 for verifying the PUF output generated from the PUF using the parity bits stored in memory. In step 272, the process receives a request for authentication, and the novel method is used to produce security keys and related data. According to the invention, this is possible without the burdensome processes used in the prior art, such as algorithms used to produce the large randomly selected prime numbers used to produce security keys such as RSA keys and other types of security keys, as is well known and understood in the art. This occurs during normal operations of a device, wherever and whenever authentication is desired, or simply when the device is powered up. The process then is followed by a process for generating the respective security keys. The process 269(a) produces a prime number P used in generating the secret or private RSA key or Secret key and the public key as is known in the art of asymmetric paired key encryption. The process 269(b) produces a prime number Q also used in generating the secret key and the public key. These processes may be performed in a parallel or serial manner, but the separate processes for generating the prime numbers and ultimately the keys do not necessarily depend on each other for completion. Since, in RSA applications, two prime numbers are required to produce the private RSA and public RSA key, the parallel processes may be necessary.

Again, the verified PUF output process 271 begins in step 272 where an authentication request is received. A PUF output is then generated in step 273. In step 274, the verification process is performed using the ECC, where the PUF output from the PUF and the ECC parity bits from memory are used to provide a verified PUF output in step 275 as will be understood by those skilled in the art of the utilization of error correction codes. That is, the error correction code is used to verify that the PUF output, which as noted above may be selected from a plurality of PUF outputs, is the same one used in the set up mode, discussed above. If the parity bit error correction check does not verify the PUF output, then another PUF output may be generated until an ECC parity bit check is successful. This should not add significantly to the generation of P and Q or the keys. This value is used in the processes 269(a) and 269(b) along with the respective offset values, offsets P and Q, to produce the respective security keys.

The process 269(a) for generating the prime number P begins in step 276 where the pseudo random number generation process, PRNG-P is performed. In step 277, the seed value, seed-P, is produced as the output of the PRNG-P. In step 278, the seed-P is combined with offset-P retrieved from memory. This may be done by simply adding or subtracting the offset-P and the seed-P values using addition logic or other processing means, such as subtraction, exclusive or, multiplication or other arithmetic process unit. A prime number prime-P is thus generated in step 279.

Figure 4A:
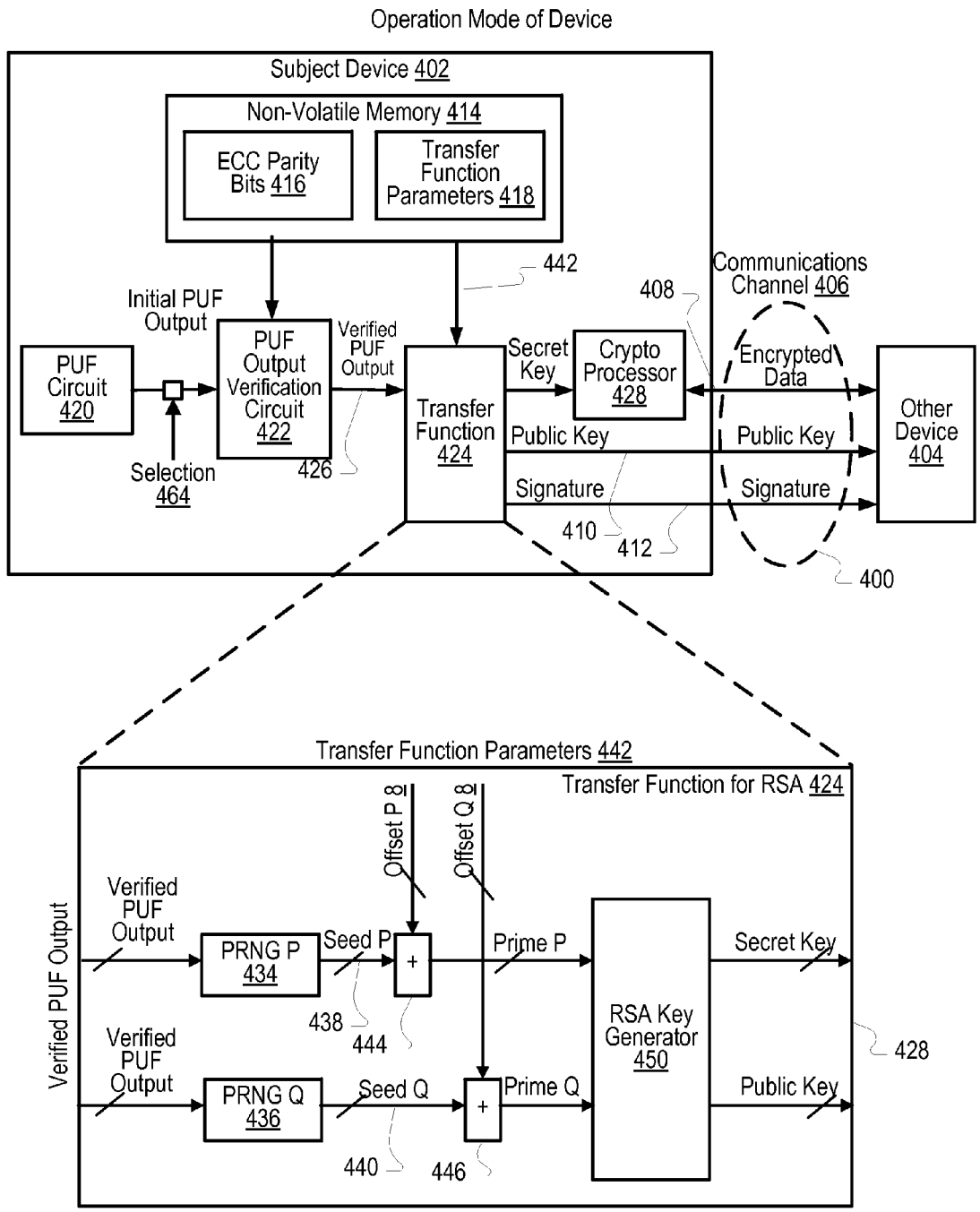
FIG. 4A is a diagrammatic view of a device configured according to the invention illustrating the operating mode of such a device after it is manufactured.
Figure 4B:
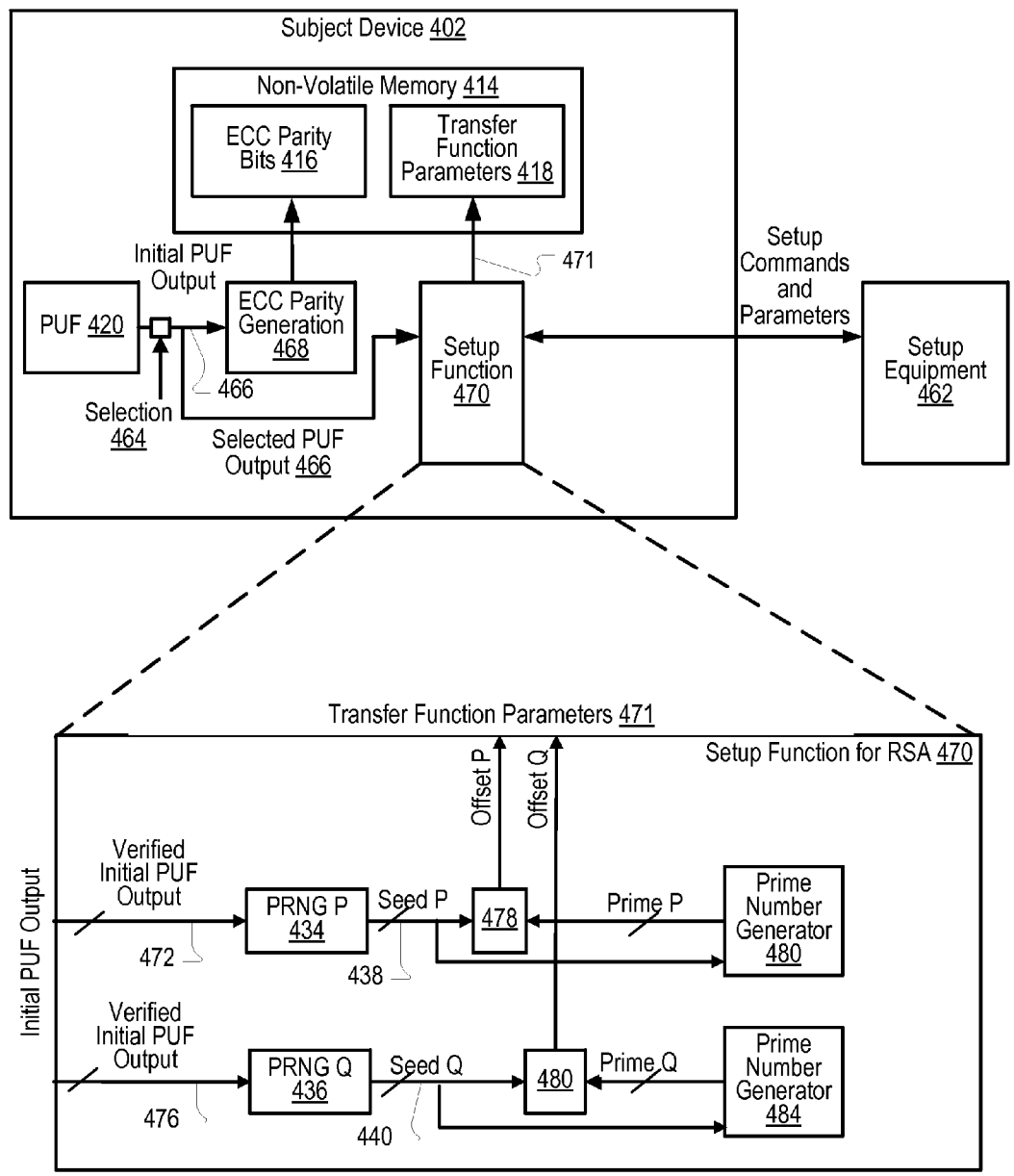
FIG. 4B is a diagrammatic view of a device configured according to the invention illustrating the set-up mode of such a device either in manufacturing or upon first use of the device.

The process 269(b) for generating a prime number Q begins in step 282 where the pseudo random number generation process, PRNG-Q is performed. It will be understood by those skilled in the art that, in order to generate a separate and unique randomly selected prime number Q the PRNG-Q 430 may be the same as PRNG-P 428 used for generation of the prime number P with a separate unique PUF circuit 420 (not shown) and verification circuit providing the PUF input, or the same verified PUF output may be supplied to a separate unique PRNG-Q 430, as illustrated in FIGS. 4A and 4B, thus providing a different output seed-Q 440 from the PRNG-Q 430 than the output seed-P 438 from the PRNG-P 428. In step 283. In step 284, the seed-Q is combined with offset-Q retrieved from memory. This may be done by simply adding or subtracting the values using addition logic or other processing means, such as subtraction, exclusive or, multiplication or other arithmetic process. A prime number prime-Q is thus generated in step 285.

Once the security keys are generated using the prime numbers P and Q, encrypted data is generated in process 293(a) For the encrypted data process 293(a), a public key cryptology process is performed in step 294 using the secret or private key produced from the prime numbers P and Q. Examples include the RSA standard, discussed above. Encrypted data is produced in step 295.

Authentication data is communicated by the authenticating device, such as a fingerprint imaging system to the device requiring authentication in step 298. This may be done at the end of the processes discussed above, or throughout the process, e.g., if the authenticating device uses the secret key as an electronic signature and "signs" the message once sent, as will be understood by those skilled in the asymmetric paired key encryption art as a typical use for the secret key. That is, the device requiring authentication, having possession of the public key can decrypt the "signature" which could only have been encrypted, therefore, by one in possession of the secret key. In the end, the novel processes performed according to the invention provide a novel means to authenticate a device without the burdensome tasks of performing authentication algorithms, such as to regenerate the necessary prime numbers and regenerate potentially unique public and private keys each time a device needs to be authenticated. This is because these processes are performed in the setup process discussed above, and offset values are instead used in combination with a PUF output using much more simple processes to generate security keys. As a result, a much improved system and method are provided by the invention for authenticating a device. In addition, only the ECC parity bits and the offsets need be stored by the authenticating device, which are useless to a security threat without the output of the PUF circuit(s).

Figure 3:
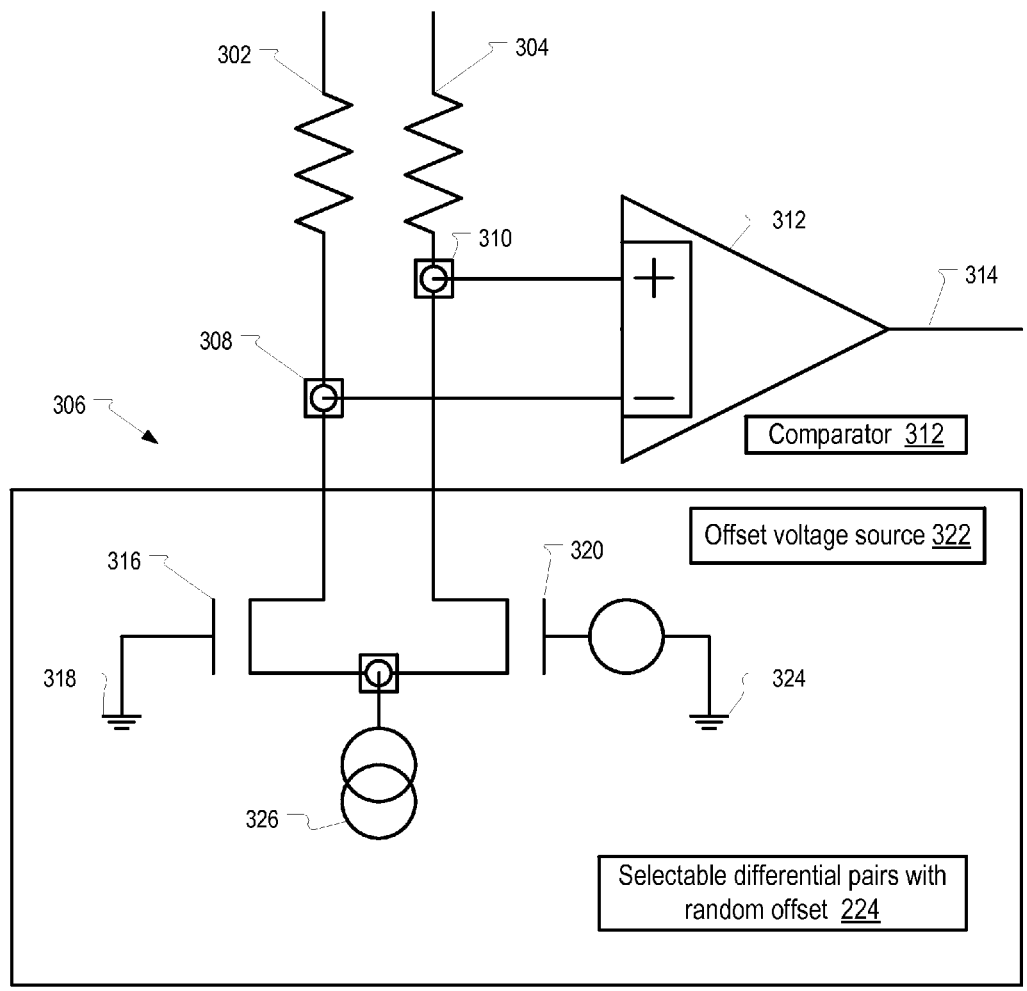
FIG. 3 is a diagrammatic view of a sample PUF circuit employed with the invention.

Referring to FIG. 3, a diagrammatic view of a sample PUF circuit, used in an integrated circuit identification (ICID) process is illustrated. This particular circuit produces 224 random bits and 32 fixed bits. The circuit includes parallel resistors 302, 304, connected at one end to voltage variant circuit 306 via nodes 308, 310, and at opposite ends to either ground, a voltage source or other entity. The nodes 308, 310 are connected to positive and negative inputs of comparator 312, having output 314. Circuit 306 includes a first transistor 316 connected at one end to node 308, at its gate to ground 318 and at another end to current source 326. The circuit 306 also includes a second transistor 320 connected on one end to node 310 and at another end to current source 226 and at its gate to offset voltage source 322, followed by ground 324. This is an example of a circuit that can produce a PUF output for use in a circuit configured according to the invention. Those skilled in the art will understand that there are many different types of circuits that can be used to produce PUF outputs. For example, again referring to U.S. Pat. No. 6,161, 213, several examples of particular PUF circuits are illustrated. The invention is not limited to any particular PUF circuit, and indeed extends to any PUF circuit or other entity that can reproducibly produce a unique output word, unpredictable from just the makeup of the circuit, which can then be used for use in generating security keys, as described above.

Referring to FIGS. 4A and 4B, more detailed embodiments of the invention are illustrated as incorporated in a generic device, and they will be described first in structure and then in terms of their operation. FIG. 4A is a diagrammatic illustration of a device embodying the invention in an operational mode. That is, this embodiment illustrates a device that has been manufactured and set up. Thus, the processes and operations required to produce the transfer function for this device (specifically the transfer function offsets in this particular embodiment) have been performed and embedded in the device. According to the invention, these processes and operations do not need to be performed any further, and the device can be authenticated without them in a novel manner. FIG. 4B is a diagrammatic illustration of a device embodying the invention in the setup mode, where the processes and operations to produce P and Q Once the transfer function parameters, i.e., the ECC parity bits and the offset-P and offset-Q, are determined at setup, they can be used to reliably reproduce P and Q from the output of the PUF(s) As discussed above, these embodiments are merely examples of embodiments, and include preferred embodiments. The separate diagrammatic views include selected components or functional blocks to separately describe the operation of a device embodying the invention in operational mode and setup mode respectively. Thus, the device may include some or all components shown separately in the figures. Also, as discussed above, some components, features or functions may exist on or off the device, and some or all of these features or resulting output values may be communicated to the device via a communications channel or other means, or may be include in other devices such as within some setup equipment for example.

Referring first to FIG. 4A, the system 400 includes a device 402 that may communicate with another device 404 or devices via a communication channel 406 for authentication processes or other purposes. For example, the device 402 may be a fingerprint sensor incorporated with an electronic device 404 such as a general purpose personal computer. In such an example, a user may swipe the fingerprint sensor 402, causing it to generate an authentication signal for the personal computer. The personal computer 404 can then use the signal, which would include the public key 410 to authenticate the device 402. The purpose of this process would be to ensure that the sensor device 402 has been authorized to securely provide fingerprint images and/or user authentication fingerprint comparison results from a user swiping a finger across the fingerprint imaging device 402 to provide access to the device 404 only by authorized individuals. Without the security process involving the different keys, as an example, a counterfeit device could possibly be used by an unauthorized user to improperly gain access to the personal computer.

In this embodiment, the communication channel includes a plurality of lines, including one for encrypted data encrypted using the secret key 408, and one for the public key 410, each of which is discussed below. Regardless of the number or configuration of the communication channels, or the different types of security keys utilized by a device, the invention, most generally, is directed to reproducing of security keys using a PUF circuit together with transfer function parameters and ECC correction code parity bits stored in the non-volatile memory 414 of the device 402. Such features and their advantages they provide are discussed in further detail below.

Still referring to FIG. 4A, as noted above, the device 402 further includes nonvolatile memory 414 configured to store data related to reproducing the public and private encryption keys. The nonvolatile memory is configured to store ECC parity bits 416, related to the operations of a PUF output verification circuit 422, and also to store transfer function parameters 418, such as offset-P and offset-Q. These ECC parity bits are then used in generating P and Q keys when combined with a verified output word from PUF circuit 420. The PUF circuit 420 is configured to generate a PUF output 421, which is a word, i.e., a digital signal of some selected length of bits, such as 256 bits, as indicated in FIG. 4A, that is uniquely and reproducibly generated from the PUF circuit 420 when it is excited or otherwise enabled.

As discussed above, PUF circuits are well known in the art, and may be configured in many ways. The invention is not limited to any particular PUF circuit, but is directed to taking a PUF output, regardless how it is configured, and using it to generate security keys for a device or system.

Once the PUF output is produced, it is selected in selection circuit 464. In this operation, a plurality of PUF outputs may be used to to ensure consistent, and thus authentic, production of the PUF output in both operational mode and also setup mode discussed below. It has been observed that the PUF output is generally stable, but some bits of the output word may toggle between logic 1 and logic 0, or vice versa, when read out at different times and possibly under different conditions. According to the invention, in order to improve the use of error correction code parity bits in the subsequent step, selection of the PUF output is performed to produce a dependable output value. Thus, it improves the use of error correction parity bits by providing a more consistent PUF circuit 420 output value. In one embodiment, this is done by reading the PUF circuit 420 output multiple times, five for example, and choosing the value that is the most consistent or similar to other output values read. An algorithm may be performed, where the multiple PUF circuit 420 output values read are evaluated to determine which is the most consistent.

The selected PUF output from the selection circuit 464 has ECC error correction parity bits generated from it which are compared with ECC parity bits 416 stored in the memory 414 in error correction code comparison circuit 422 to generate a verified PUF output 426. That is, as will be understood by those skilled in the art of the use of error correction coding, such as in the art of data transmission, matching parity bits in the error correction code indicate the PUF output is the same as the one used for the set up mode, discussed below, i.e., is "verified." If there is not a match, as will be understood by those skilled in the art, another PUF circuit 420 output can be generated and tested until one is eventually "verified."

The purpose of the use of ECC, will, therefore, be understood to be to ensure consistency in the repeated generation of the PUF output upon authentication of the device. Once set up in setup mode, discussed further below, the invention provides a means to consistently generate a PUF output, and in turn generate consistent P and Q and, in turn, consistent security keys. Consistency is critical for proper operation of such security operations. For example, another device 404, such as a laptop computer, may require authentication upon each powering up the device 402. Of course, it is critical that the device 402, when properly configured, be able to power up without being encumbered by the security processes. As another example, a fingerprint sensor is enabled by a user upon swiping a finger surface across the sensor. After doing so, a user would be frustrated if the security process ever failed because of a technical error. Thus, consistency in operation is critical for any security device. The invention provides a means for consistently producing security keys for use in authentication.

Furthermore, it is important that any security processes be completed quickly. As discussed in the background, delays in security procedures are intolerable in devices. In either the laptop power up example or the fingerprint sensor example, a user would be frustrated with any unnecessary delays. According to the invention, the time required to complete the process of generating public and private encryption keys is greatly reduced. This is a result of the unique ability of a device configured according to the invention to rapidly and uniquely to the device 402 generate the encryption keys by using the PUF circuit. Generation of a output word by the PUF circuit requires no complicated or burdensome processing by a processor, and the generation of the encryption keys can then be done with simple processing functions, as describe herein.

In addition to consistency and timeliness, it is imperative that security be maintained in producing such security keys.

According to the invention, the verified PUF circuit 420 output enables the device 402 to generate the encryption keys entirely within the device 402, securing the process from outside observation or interference. Also, since the PUF circuit 420 output is not stored in memory, it is not vulnerable to interrogation outside the device 402. Still further, the data stored in memory 414 is but a small part of the key generation process, which cannot be observed or recreated outside the device 402. The parity bits 416 or transfer function parameters 418, such as offset-P and offset-Q, even if they were observed from outside the device, in no way reveal the output word of the PUF circuit 420, nor the generated P and Q. Thus, the PUF circuit 420 output can be used to create encryption codes in a manner that cannot be reverse engineered or otherwise duplicated by observers or interrogating entities outside the device 402.

Still referring to FIG. 4A, the verified PUF circuit 420 output 426 is transmitted to the transfer function circuit 424, where a secret or private key and a public key are generated using the derivatives of the PUF output, i.e., the selected and verified PUF output. Thus, these keys are derived from an output word generated by the PUF circuit 420 as selected and verified, making them difficult if not realistically impossible to duplicate for a particular device 402. A system or device 402 configured according to the invention would be extremely difficult to counterfeit, replicate, interrogate or otherwise breach its security. The verified PUF output 426 is received by the transfer function circuit 424 in two different paths 428 and 430 for use in deriving the two three different encryption keys, the secret or private key and the public key. The verified PUF circuit 420 output is illustrated as a 256 bit word, but may be larger or smaller depending on the application. In practice, the verified PUF circuit 420 output may be used in full or in part by each key producing process. For example, a portion of the verified PUF or the entire verified PUF output may be used in each path 428 and 430, 432. Alternatively, different portions of the verified PUF output may be used in different paths to further complicate the process, further obscuring the process required to generate the security keys. Those skilled in the art will understand that different combinations and permutations of the verified PUF output may be used to derive the different keys, and the invention is not limited to nor obviated by any particular combination chosen for a particular application or embodiment. It will also be understood that two different PUF circuits 420 may be employed that are unique to the device 402, and/or two different pseudorandom number generators, as discussed below, may be utilized to make up the processing paths for consistently regenerating P and Q each time for the consequent production of the unique and consistent public key and private key.

In generating P, the verified PUF circuit 420 output 472 is received by a pseudo random number generator 428 to produce a value 438, Seed P, which, as illustrated, may be 1024 bits in length. This seed P value 438 is received by an arithmetic unit 444, an adder in this particular embodiment, to combine with a corresponding offset value, Offset P. Those skilled in the art will understand that this and other arithmetic units may be implemented as adders, subtraction units, dividers, multipliers, exclusive- or logic units or other arithmetic or logic units implemented to combine the seeds with the offset values, in the reverse of how the Offset P was determined from the seed P value and a P as found in the set up mode discussed below in regard to FIG. 4B. In this particular embodiment, the Seed P is added to Offset P to generate a prime number, Prime P. This P, along with Q, generated as described below, is used by an encryption key generator, such as the RSA key generator 450, to generate the secret and private key for use in authentication. Those skilled in the art will also understand that pseudo random number generators, RSA key generators, and other components discussed herein but not described in explicit detail are well known in the art. Encrypted data may be transmitted between another device 404 and the subject device 402

Similarly, in generating Q utilized to produce the private key and the public key, the verified PUF circuit 420 output 474 is received by a pseudo random number generator 436 to produce a value 440, Seed Q, which, as illustrated, may be of 1024 bits in length. This seed value is received by an arithmetic unit 446, an adder in this particular embodiment, to combine with a corresponding offset value, Offset P. The Seed Q is added to Offset Q to generate a prime number, Prime Q. This Q is used by a security key generator, such as the RSA key generator 450, along with P to generate the secret and public key, each a 2048 bit value in this example, for use in authentication with another device 404. As will be understood by those skilled in the art, the product of P and Q is obtained, which is 2048 in length, as each are 1024 bits in length.

In this embodiment, the pseudo random number generators 434, 436 are the same for both operation mode as well as setup mode discussed below. This is to ensure that P and Q are the same as for set up mode because the operations are consistent when generating the prime numbers P and Q, so that the prime numbers P and Q used to generate the offset values stored during set up are the same as those produced in the operational mode of FIG. 4A and used in generating the encryption keys during operation mode. Those skilled in the art will understand that there are different components that can be duplicated or reused for either the operation mode circuitry and software or setup circuitry and software, and that different applications may require or allow flexibility for different configurations.

In operation, the system is configured to perform a method of electronically securing a device 402 by first generating an output from the PUF circuit(s) 420. In order to authenticate itself, the device 402 is configured to retrieve a transfer function parameter stored in memory and generate a prime number P or Q used in generating encryption keys. This can be done by performing a transfer function algorithm using the PUF circuit 429 output(s) and a transfer function parameter to produce P or Q. The method may further include performing error correction parity bit checking on the PUF circuit 420 output(s) to produce a verified PUF output(s) (472, 474 in FIG. 4B); and generating encryption security keys by performing a transfer function algorithm using the verified PUF circuit 420 output(s) and a transfer function parameter from storage to produce the respective prime numbers P and Q. The process of utilizing error correction code checking may include receiving the PUF circuit 420 output, generating ECC parity bits for the PUF circuit 420 output and retrieving ECC parity bits and executing an error correction algorithm using the PUF circuit 420 output and the parity bits, i.e., checking the generated parity bits with the stored parity bits. Generating encryption keys includes generating the required P and Q by, e.g., performing a transfer function algorithm using the PUF circuit 420 output and a respective transfer function parameter 418 from storage 414.

The PUF circuit 420 output verification process, where generating an output from a physically unclonable function (PUF) circuit 420 includes exciting a PUF circuit 420 to produce an initial PUF circuit 420 outputs, then selecting the PUF circuit 420 selected output using a selection process to produce the selected PUF circuit 420 output. The invention further provides for performing error correction parity bit checking on the selected PUF circuit 420 output using the error correction parity bits to produce a verified PUF circuit 420 output. The retrieving of a transfer function parameter from storage 414 includes retrieving a plurality of transfer function offset values stored in non-volatile memory 414 on the device 402. Thus, generating encryption keys includes executing a transfer function algorithm using the verified PUF output and at least one transfer function offset values 418 obtained from storage 414, i.e., adding or subtracting the offset-P from the generated seed-P and the offset-Q from the seed-Q.

The invention thus includes a method for generating prime numbers using a PUF circuit 420 output, in particular a verified PUF circuit 420 output, inputting the verified PUF circuit output into a pseudo random number generator 428, 430, to produce a respective seed-P and seed-Q and then applying an offset value offset-P and offset-Q to the respective seed-P and seed-Q, wherein generating encryption keys includes utilizing the generated P and Q. The encryption keys can then be generated using the prime numbers P and Q. In a preferred embodiment, a plurality of security keys, i.e., the public key and private key, can be generated by receiving the PUF circuit 420 output by a plurality of pseudo random number generators, i.e., 428, 439 to produce a plurality of seed values, i.e., seed-P 438 and seed-Q 440. A plurality of prime numbers, i.e., P and Q can then be generated by combining the seed values 438, 440 with corresponding transfer function offset values offset-P and offset-Q. The encryption keys may then be generated using the plurality of prime numbers P and Q.

In the embodiment illustrated and discussed above, encryption keys are generated using two random number generators 428, 436 (434, 436, shown in FIG. 4B in regard to set up mode, but intended to be the same as 428, 430 in operation mode as illustrated in FIG. 4A) to generate two prime numbers P and Q, where a PUF circuit 420 output, a verified PUF circuit 420 output in this embodiment, is received by two independent pseudo random number generators 428, 436 to produce two seed values, seed-P and seed-Q. Two prime numbers are generated by combining the two seed values with corresponding transfer function offset values, offset-P and offset-Q. Two encryption keys, i.e., the public key and private key, are then generated using the two prime numbers P and Q. The method to ultimately generate the public and private encryption keys includes using P and Q as is well known and understood by those skilled in the art of asymmetric paired key encryption technology.

Referring to FIG. 4B, one configuration of a device 402 components used in setup mode is illustrated. Similar to the description of FIG. 4A, selected components are included to illustrate the operation and structure that are relevant to the device 402 for purposes of explaining the setup mode. Some components necessarily need to be the same as those used in the operation mode in order for the operations to consistently operate during the setup process and also during normal operations, where the device is authenticated during normal use, as will be understood by those skilled in the art. Those skilled in the art will understand that much variation in component implementation is possible without departing from the spirit and scope of the invention, including location, redundancy, selection, and other aspects of different components, and also that different components may exist on a single integrated circuit chip, different chips or circuit boards, on the device 402 or off. Each of these aspects of the device 402 may vary from application to application depending on the design specifications, variations and restraints.

The system for setup includes the device 402 and setup equipment 462, which may be a part of the device 402, where communications occur between the device 402 and the setup equipment 462, including setup commands and parameters. The setup equipment may exist in a manufacture setting. Communications may also include authentication communications, where the test equipment acts as another device, such as other device 404 in FIG. 4A, in order to run the device in operation mode. This may be done if it is desired to set up the device 402 in production, and also for testing of the device 402, whether it is for quality assurance and control or for individual device testing. Those skilled in the art will understand that different marketing professionals, designers or engineers may employ different setup operations for different applications.

The device 402 includes a PUF circuit 420 configured to generate an initial PUF circuit 420 output 421. This is the same as the PUF circuit 420 output used in the operation mode as described above in connection with FIG. 4A. In the setup mode, the PUF circuit 420 output is termed initial PUF circuit 420 output because it needs to be more refined in the setup mode to ensure that the parity bits 416 and transfer function parameters 418 created for later use in the operations mode of FIG. 4A are accurate. This is necessary to ensure proper authentication occurs each time it is required during the operation mode of the device 402. Thus, a PUF selection module 464 is configured to receive the initial PUF circuit 420 output, and produce a selected PUF circuit 420 output 466 in the setup mode. This can be the same operation as the selection operation discussed above with respect to the operational mode. Either way, in a preferred embodiment, the selection operation can be performed in both the operational mode and the setup mode in order to better provide a consistent PUF circuit 420 output value or not, e.g. relying on ECC to insure the PUF circuit 420 output used in operation mode (FIG. 4A) is the same as used in set up mode (FIG. 4B). According to the invention, the PUF circuit 420 output is unique to each device 402, and this component needs to be used in both the setup mode and operation mode in a preferred embodiment.

The selected PUF circuit 420 output 466 is transmitted to ECC parity generation circuit 468 and also Setup Function circuit 470. The ECC parity generation 468 circuit may be incorporated with ECC error correction circuit 422 shown in FIG. 4A. In fact, the ECC parity generation function may be done off the device 402 in setup equipment. One draw back to performing the parity generation off the device 402 is security. If the process is performed on the device 402, and possibly on the same chip as the PUF circuit 420 or other circuits and components, it is not detectable or observable outside the device 402. Even if reverse engineered, where the PUF circuit 420 is microscopically dismantled, analyzed or observed, neither the output of the PUF circuit 420 nor the parity generation could be easily breached by an intruder. If performed externally, such as by a technician where the device 420 is manufactured and setup, then a security risk exists in that communication link. This may not be a concern in applications where facilities and personnel are relatively secured, and where the communication link has a low risk of being breached. However, in facilities where personnel or facilities are not secured, such a risk may not be acceptable. Those skilled in the art will understand that different applications may call for different configurations when varying risks such as these are at issue.

The setup function circuit 470 is configured to receive a selected PUF circuit output, where selection of the PUF circuit 420 output(s) is performed, in two separate channels 472 and 474. In the embodiment illustrated, the selected PUF circuit 420 output value is a 256 bit value, which may be larger or smaller depending on a particular application. As discussed above, in practice, the selected PUF circuit 420 output may be used in full or in part by each offset producing process channel 472, 474. For example, a portion of the selected PUF circuit 420 output or the entire selected verified PUF circuit 420 output may be duplicated for use in each path 472 and 474. Alternatively, different portions of the selected PUF circuit 420 output may be used in different paths 472, 474 to further complicate the process, further obscuring the process required to generate the prime number P and Q offset values. Those skilled in the art will understand that different combinations and permutations of the selected PUF circuit 420 output may be used to derive the different offset values, and the invention is not limited to nor obviated by any particular combination chosen for a particular application or embodiment.

In the first channel 472, a pseudo random number generator PRNG-P 434 is used to produce a seed-P 438 for use in generating offset value offset-P. The seed value 438 is illustrated as a 1024 bit word, but may be larger or smaller and may depend on the PUF circuit 420 input or the application. This seed-P is transmitted to the prime number generator 480 to produce prime number value prime-P, which is also illustrated here as a 1024 bit word, but may be larger or smaller depending on the application. The prime-P value is then combined with seed-P in arithmetic unit 478 to produce offset value offset-P. That is, the offset represents some difference between the seed P and the generated prime number P produced using seed-P, e.g., checking numbers above, and/or below seed-P to find a prime number P and then noting the difference ("offset") between the prime P and seed-P. The arithmetic unit is shown here as a subtraction unit that typically has subtraction logic. It may, however, be an addition unit, exclusive-or unit, or other logical arithmetic unit. The offset-P value shown here is an 8 bit value, but may be larger or smaller depending on the application, e.g., the value of the actual offset-P. As shown in this embodiment, since this is an offset value, and not a large security key value, the offset value can be relatively small, and thus easily stored in a small amount of memory. According to the invention, this provides a very useful means for storing a small amount of security data for use in generating encryption keys.

In the second channel 474, a pseudo random number generator PRNG-Q 436 is used to produce a value seed-Q 440 for use in generating offset value offset-Q. The seed value 440 is illustrated as a 1024 bit word, but may be larger or smaller and may depend on the PUF circuit 420 input or the application. This seed-Q is transmitted to the prime number generator 484 to produce prime number value prime-Q, which is also illustrated here as a 1024 bit word, but may be larger or smaller depending on the application. The prime-Q value is then combined with seed-Q in arithmetic unit 480 to produce offset value offset-Q, as discussed above with respect to prime-P and seed-P. The arithmetic unit is shown here as a subtraction unit that typically has subtraction logic. It may, however, be an addition unit, exclusive-or unit, or other logical arithmetic unit. Like the P values, the offset-Q value shown here is an 8 bit value, but may be larger or smaller depending on the application and the size of offset-Q. As shown in this embodiment, since this is an offset value, and not a large security key value, the offset value can be relatively small, and thus easily stored in a small amount of memory. According to the invention, this provides a very useful means for storing a small amount of security data for use in generating security keys.

To summarize, in set up mode, offset values offset-P or offset-Q are generated by first generating a first seed value, seed-P or seed-Q, with a pseudo random number generator 434, 436. Next, a prime number P or Q is generated with a first prime number generator 480, 484 using the respective first seed value-P and seed value-Q. Then, a respective transfer function offset value offset-P or offset-Q is computed using the seed value seed-P or seed-Q and the respective prime number P and Q. Computing the first and second offset values may include performing an arithmetic operation using the respective seed value and prime number. The arithmetic operation may be addition, subtraction, division or some other arithmetic operation.

Prior to generating the offset values in the setup mode, the PUF circuit 420 output value may be selected by performing a selection algorithm to the PUF circuit 420 output to produce a selected PUF circuit 420 output. Performing a selection algorithm may include receiving multiple PUF circuit 420 outputs and choosing a statistically consistent output value to produce the selected PUF circuit 420 output.

The invention may also involve a number of functions to be performed by a computer processor, which may be as simple as combinatorial logic, or may include more complex devices such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of computers, such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

The apparatus and method include a method and apparatus for providing public and private encryption keys utilizing a PUF circuit incorporated in an integrated circuit chip and related applications for use in the operation of a electronic device where authentication processes are utilized. In operation, the stored parameters discussed above can be used to more efficiently and quickly authenticate the device without the need to run the usual burdensome encryption key generation processes without compromising the level of security in the device. Although this embodiment is described and illustrated in the context of devices, systems and related methods of authenticating devices, the scope of the invention extends to other applications where such functions are useful. Furthermore, while the foregoing description has been with reference to particular embodiments of the invention, it will be appreciated that these are only illustrative of the invention and that changes may be made to those embodiments without departing from the principles of the invention.

The invention claimed is:

1. A method comprising:
    generating an output from a physically unclonable function (PUF) circuit to produce a PUF circuit output;
    performing, via a computing device, a statistical selection process on the PUF circuit output to produce a selected PUF circuit output;
    performing, via the computing device, a verification process on the selected PUF circuit output, to verify the selected PUF circuit output as a verified PUF circuit output; and
    generating, via the computing device, at least one random prime number suitable for generating an asymmetric public key encryption matching key pair, by performing a transfer function algorithm by applying a transfer function parameter to a derivative of the verified PUF circuit output, the transfer function parameter comprising an offset value, and wherein executing the transfer function further comprises:
        producing a pseudo random number seed value from the verified PUF circuit output by using a pseudo random number generator on the verified PUF circuit output producing a derivative of the verified PUF circuit output;
    the method further comprising:
    generating a plurality of random prime numbers suitable for generating an asymmetric public key encryption matching key pair by:
    receiving the verified PUF circuit output by a respective one of a plurality of pseudo random number generators to produce a plurality of seed values as derivatives of the respective verified PUF circuit output;
    generating each of a plurality of prime numbers by combining a respective seed value with a respective corresponding transfer function offset value; and
    generating an asymmetric public key encryption matching key pair using the plurality of prime numbers.

2. A method according to claim 1, further comprising generating a plurality of random prime numbers suitable for generating an asymmetric public key encryption matching key pair by:
    receiving the one of the PUF circuit output and the selected PUF circuit output by a respective one of a plurality of pseudo random number generators to produce a respective one of a plurality of seed values;
    generating each of a plurality of prime numbers by combining a respective seed value with a respective corresponding transfer function offset value; and
    generating an asymmetric public key encryption matching key pair using the plurality of prime numbers.

3. A method according to claim 1, further comprising generating a plurality of random prime numbers suitable for generating an asymmetric public key encryption matching key pair by:
    receiving a first verified PUF circuit output as an input to a pseudo random number generator to produce a first seed value derivative of the first verified PUF circuit output and receiving a second verified PUF circuit output as an input to the pseudo random number generator to produce a second seed value derivative of the second verified PUF circuit output;
    generating a first prime number and a second prime number by combining each of the respective first seed value and the respective second seed value with a respective first corresponding transfer function offset value and a respective second corresponding transfer function offset value; and
    generating, via the computing device, an asymmetric public key encryption matching key pair private key and public key using the first prime number and the second prime number to generate each of the private key and the public key.

4. A method according to claim 1, wherein generating an offset value comprises:
    generating a seed value by applying the verified PUF circuit output to the pseudo random number generator;
    generating, via the computing device, a prime number using the seed value; and
    computing a transfer function offset value using the seed value and the prime number.

5. A method according to claim 1, wherein generating the first prime number and the second prime number comprises generating, via the computing device, a first seed value and a second seed value and applying the respective transfer function first offset value and second offset value obtained from memory to each of the first seed value and the second seed value respectively.

6. A method comprising:
    generating a plurality of random prime numbers suitable for generating an asymmetric public key encryption matching key pair by:
    generating an output from a physically unclonable function (PUF) circuit to produce a PUF circuit output;
    performing, via a computing device, a statistical selection process on the PUF circuit output to produce a selected PUF circuit output;
    performing, via the computing device a verification process on the selected PUF circuit output, to verify the selected PUF circuit output as a verified PUF circuit output; and
    generating, via the computing device, at least one random prime number suitable for generating an asymmetric public key encryption matching key pair, by performing a transfer function algorithm using a derivative of the verified PUF circuit output, along with a transfer function parameter, the transfer function parameter comprising an offset value, and wherein executing the transfer function algorithm further comprises:
        producing a pseudo random number seed value as a derivative of the verified PUF circuit output by using a pseudo random number generator on the verified PUF circuit output;

the method further comprising:
providing the verified PUF circuit output to two independent pseudo random number generators to produce two seed values;
generating each of two random prime numbers by combining a respective one of the two seed values with a corresponding transfer function parameter offset value; and
generating, via the computing device, an asymmetric public key encryption matching key pair using the two prime numbers.

7. A method comprising
generating a plurality of random prime numbers suitable for generating an asymmetric public key encryption matching key pair by:
generating an output from a physically unclonable function (PUF) circuit to produce a PUF circuit output;
performing, via a computing device, a statistical selection process on the PUF circuit output to produce a selected PUF circuit output;
performing, via the computing device, a verification process on one of the PUF circuit output and the selected PUF circuit output, to verify the one of the PUF circuit output and the selected PUF circuit output as a verified PUF circuit output; and
generating, via the computing device, at least one random prime number suitable for generating an asymmetric public key encryption matching key pair, by performing a transfer function algorithm using the verified PUF circuit output, along with a transfer function parameter, the transfer function parameter comprising an offset value, and wherein executing the transfer function further comprises:
producing a pseudo random number seed value from the verified PUF circuit output as a derivative of the verified PUF circuit by using a pseudo random number generator on the verified PUF circuit output;
the method further comprising:
receiving a first verified PUF circuit output as an input to a pseudo random number generator to produce a first seed value derivative of the first verified PUF circuit output and receiving a second verified PUF circuit output as an input to the pseudo random number generator to produce a second seed value derivative of the second verified PUF circuit output;
generating a first prime number and a second prime number by combining the respective first seed value and the respective second seed value with a respective first corresponding transfer function parameter offset value and a respective second corresponding transfer function parameter offset value; and
generating, via the computing device, an asymmetric public key encryption matching key pair private key and public key using the first prime number and the second prime number to generate each of the private key and the public key.

8. A method according to claim 7, wherein the first seed value and the second seed value and the first prime number and the second prime number are integers, and wherein defining the respective transfer function offset values includes calculating respectively the difference between the first seed value and the first prime number and between the second seed value and the second prime number.

9. A method comprising:
generating an output from a physically unclonable function (PUF) circuit to produce a PUF circuit output;
performing, via a computing device, a statistical selection process on the PUF circuit output to produce the selected PUF circuit output;
performing, via the computing device, a verification process on the selected PUF circuit output, to verify the selected PUF circuit output as a verified PUF circuit output;
generating at least one random prime number suitable for generating an asymmetric public key encryption matching key pair by performing, via the computing device, the transfer function algorithm using a derivative of the verified PUF circuit output and the transfer function parameter;
wherein the transfer function parameter comprises an offset value, and wherein performing the transfer function algorithm further comprises:
producing a pseudo random number seed value as the derivative of the verified PUF circuit output by using a pseudo random number generator on the verified PUF circuit output;
the method further comprising:
wherein generating the offset value comprises:
generating a seed value by applying the verified PUF circuit output to the pseudo random number generator;
generating, via the computing device, a prime number using the seed value; and
computing a transfer function offset value using the seed value and the prime number.

10. A method comprising:
generating, via a computing device, a plurality of random prime numbers suitable for generating an asymmetric public key encryption matching key pair by:
generating an output from a physically unclonable function (PUF) circuit to produce a PUF circuit output;
performing, via a computing device, a statistical selection process on the PUF circuit output to produce a selected PUF circuit output;
performing via a computing device a verification process on the selected PUF circuit output, to verify the selected PUF circuit output as a verified PUF circuit output;
generating, via a computing device, a random prime number suitable for generating an asymmetric public key encryption matching key pair by performing, via the computing device, the transfer function algorithm using a derivative of the verified PUF circuit output and a transfer function parameter;
wherein the transfer function parameter comprises an offset value, and wherein generating the transfer function comprises:
receiving a first verified PUF circuit output as an input to a pseudo random number generator to produce a first seed value derivative of the first verified PUF circuit output and receiving a second verified PUF circuit output as an input to the pseudo random number generator to produce a second seed value derivative of the second verified PUF circuit output;
generating a first prime number and a second prime number by combining the respective first seed value and the respective second seed value with a respective first corresponding transfer function offset value and a respective second corresponding transfer function offset value; and
generating, via the computing device, an asymmetric public key encryption matching key pair private key and public key using the first prime number and the second prime number to generate each of the private key and the public key;
wherein the first seed value and the second seed value and the first prime number and the second prime number are integers, and wherein defining the respective transfer function offset values includes calculating respectively the difference between the first seed value and the first prime number and between the second seed value and the second prime number.

11. A method comprising:
generating an output from a physically unclonable function (PUF) circuit to produce a PUF circuit output;
performing via the computing device a statistical selection process on the PUF circuit output to produce the selected PUF circuit output;
performing, via the computing device, a verification process on the selected PUF circuit output, to verify the selected PUF circuit output as a verified PUF circuit output;
generating at least one random prime number suitable for generating an asymmetric public key encryption matching key pair by performing, via the computing device, the transfer function algorithm using a derivative of the verified PUF circuit output and a transfer function parameter, the transfer function parameter comprising an offset value, and wherein generating the transfer function further comprises:
producing a pseudo random number seed value as the derivative of the verified PUF circuit output from the verified PUF circuit output by using a pseudo random number generator on the verified PUF circuit output;
the method further comprising:
wherein generating the first prime number and the second prime number comprises:
generating, via the computing device, a first seed value and a second seed value and applying the respective transfer function first offset value and second offset value obtained from memory to each of the first seed value and the second seed value respectively.

* * * * *

UNITED STATES PATENT AND TRADEMARK OFFICE
CERTIFICATE OF CORRECTION

| | | |
|---|---|---|
| PATENT NO. | : 8,290,150 B2 | Page 1 of 1 |
| APPLICATION NO. | : 11/779215 | |
| DATED | : October 16, 2012 | |
| INVENTOR(S) | : Erhart et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1027 days.

Signed and Sealed this
Second Day of September, 2014

Michelle K. Lee
*Deputy Director of the United States Patent and Trademark Office*